United States Patent
Nakajima

(10) Patent No.: US 9,715,454 B2
(45) Date of Patent: Jul. 25, 2017

(54) DATA PROCESSING DEVICE WITH MULTIPLE CPUS OPERATING AS AN SIMD TYPE

(71) Applicant: Renesas Electronics Corporation, Kawasaki-shi, Kanagawa (JP)

(72) Inventor: Masami Nakajima, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 58 days.

(21) Appl. No.: 14/804,293

(22) Filed: Jul. 20, 2015

(65) Prior Publication Data

US 2016/0041912 A1    Feb. 11, 2016

(30) Foreign Application Priority Data

Aug. 7, 2014    (JP) .................................. 2014-160967

(51) Int. Cl.
| | | |
|---|---|---|
| *G06F 12/00* | (2006.01) | |
| *G06F 12/0842* | (2016.01) | |
| *G06F 12/0875* | (2016.01) | |
| *G06F 12/0811* | (2016.01) | |
| *G06F 12/0813* | (2016.01) | |

(52) U.S. Cl.
CPC ...... *G06F 12/0842* (2013.01); *G06F 12/0811* (2013.01); *G06F 12/0813* (2013.01); *G06F 12/0875* (2013.01); *G06F 2212/1021* (2013.01); *G06F 2212/452* (2013.01); *Y02B 60/1225* (2013.01)

(58) Field of Classification Search
CPC .. G06F 12/0842; G06F 13/16; G06F 12/0811; G06F 12/0813; G06F 12/0875; G06F 2212/452; G06F 2212/1021; G06F 12/1054; G06F 2212/1028; Y02B 60/1225
USPC ........ 710/316, 317, 220, 240; 711/125, 147, 711/150, 151, 158
See application file for complete search history.

(56) References Cited

U.S. PATENT DOCUMENTS 5,696,985 A *  12/1997  Crump ...................... G06F 9/34
                                                        345/503
6,353,876 B1 *  3/2002  Goodwin ............ G06F 12/0882
                                                        711/121

(Continued)

FOREIGN PATENT DOCUMENTS

| JP | 04-291642 A | 10/1992 |
| JP | 09-198310 A | 7/1997 |

*Primary Examiner* — Hong Kim
(74) *Attorney, Agent, or Firm* — Shapiro, Gabor and Rosenberger, PLLC

(57) ABSTRACT

The disclosed invention enables the operation of an MIMD type, an SIMD type, or coexistence thereof in a multiprocessor system including a plurality of CPUs and reduces power consumption for instruction fetch by CPUs operating in the SIMD type. A plurality of CPUs and a plurality of memories corresponding thereto are provided. When the CPUs fetch instruction codes of different addresses from the corresponding memories, the CPUs operate independently (operation of the MIMD type). On the other hand, when the CPUs issue requests for fetching an instruction code of a same address from the corresponding memories, that is, operate in the SIMD type, the instruction code read from one of the memories by one access is parallelly supplied to the CPUs.

14 Claims, 14 Drawing Sheets

(56) References Cited

U.S. PATENT DOCUMENTS

| | | | | |
|---|---|---|---|---|
| 6,470,376 | B1* | 10/2002 | Tanaka | G06F 9/30087 375/E7.093 |
| 6,651,139 | B1* | 11/2003 | Ozeki | G06F 12/084 711/113 |
| 7,555,607 | B2* | 6/2009 | Collard | G06F 9/52 711/125 |
| 2003/0115402 | A1* | 6/2003 | Dahlgren | G06F 12/0831 711/1 |
| 2009/0119481 | A1* | 5/2009 | Vishkin | G06F 9/3851 712/29 |
| 2010/0262883 | A1* | 10/2010 | Arimilli | G06F 9/546 714/748 |
| 2010/0332761 | A1* | 12/2010 | Li | G06F 12/0893 711/129 |
| 2011/0026396 | A1* | 2/2011 | Nakajima | H04L 47/125 370/221 |
| 2011/0173477 | A1* | 7/2011 | Asaba | G06F 1/3203 713/323 |

\* cited by examiner

DATA PROCESSING DEVICE WITH MULTIPLE CPUS OPERATING AS AN SIMD TYPE

CROSS-REFERENCE TO RELATED APPLICATIONS

The disclosure of Japanese Patent Application No. 2014-160967 filed on Aug. 7, 2014 including the specification, drawings and abstract is incorporated herein by reference in its entirety.

BACKGROUND

The present invention relates to a data processing device, and is particularly suited to a data processing device including a plurality of CPUs (Central Processing Units) of an SIMD (Single Instruction Multiple Data) type.

Nowadays, there are increasing demands for high processing performance on media processing (image processing, speech processing). The media processing is characterized by performing the same calculation on a plurality of media data streams (images, speech). By parallelly performing such processing, it is possible to improve the processing performance. Nowadays, as processing devices for parallelly performing media processing, multi-core CPUs, SIMD-type media processors, dedicated media engines, and the like are developed and included in various products. The SIMD is architecture of data processing devices comprised of multi-core CPUs or the like for implementing processing for parallelly performing the same calculation on a plurality of data streams, and is therefore suitable for media processing including image processing and speech processing which perform the same calculation on a plurality of media data streams (pixels, sounds).

In the multi-core CPU, a plurality of CPUs parallelly perform different media processes. In this case, each CPU has an instruction cache memory, and can fetch an instruction simultaneously and independently. On the other hand, the SIMD-type media processor and the dedicated media engine are of architecture specific to media processing. In general, a system configured with the SIMD-type media processor or the dedicated media engine also includes CPUs for executing processing other than media processing.

Japanese Unexamined Patent Publication No. Hei 9(1997)-198310 (Patent Document 1) discloses a multiprocessor system in which a plurality of units each comprised of a processor, a cache memory, and a control section are coupled to a main storage device through a common bus, and the control sections of the units are coupled to each other through a dedicated bus. When a cache miss occurs in one unit, address information at this time is transferred to another unit through the dedicated bus, and the cache memory is accessed based on the address received by the unit. After a hit, read data is supplied through the dedicated bus to the unit where the cache miss has occurred.

Japanese Unexamined Patent Publication No. Hei 4(1992)-291642 (Patent Document 2) discloses a multiprocessor system in which a plurality of processors each provided with a dedicated cache memory are coupled to a main storage device through a common bus. If target data exists in one cache memory, the data is read from the cache memory. If target data does not exist in one cache memory and exists in another cache memory, the data is read from the cache memory where the data exists, and is transferred to a processor that has requested the data.

SUMMARY

The present inventors have examined Patent Documents 1 and 2 and found the following problem.

In the case of performing media processing of the SIMD type using multi-core CPUs of the MIMD (Multiple Instruction Multiple Data) type described in Patent Documents 1 and 2; despite the same processing, the instruction caches of the CPUs all have to operate, which increases power consumption. On the other hand, the SIMD-type media processor and the dedicated media engine can efficiently execute media processing, but do not operate in other than media processing; accordingly, CPUs for performing processing other than media processing and memories need to be provided separately, which increases area overhead.

While means for solving the problem will be described below, the other problems and novel features will become apparent from the description of this specification and the accompanying drawings.

One embodiment will be briefly described as follows.

A data processing device according to one embodiment includes a plurality of CPUs and a plurality of memories corresponding thereto. When the CPUs fetch instruction codes of different addresses from the corresponding memories, the CPUs operate independently. On the other hand, when the CPUs issue requests for fetching an instruction code of a same address from the corresponding memories, the instruction code read from one of the memories by one access is parallelly supplied to the CPUs.

An effect obtained by the one embodiment will be briefly described as follows.

That is, without degrading peak performance at the time of operating the CPUs independently, when the CPUs operate in the SIMD type, only one of the memories is accessed, thus making it possible to reduce power consumption.

DETAILED DESCRIPTION

1. Outline of Embodiments

Figure 1:
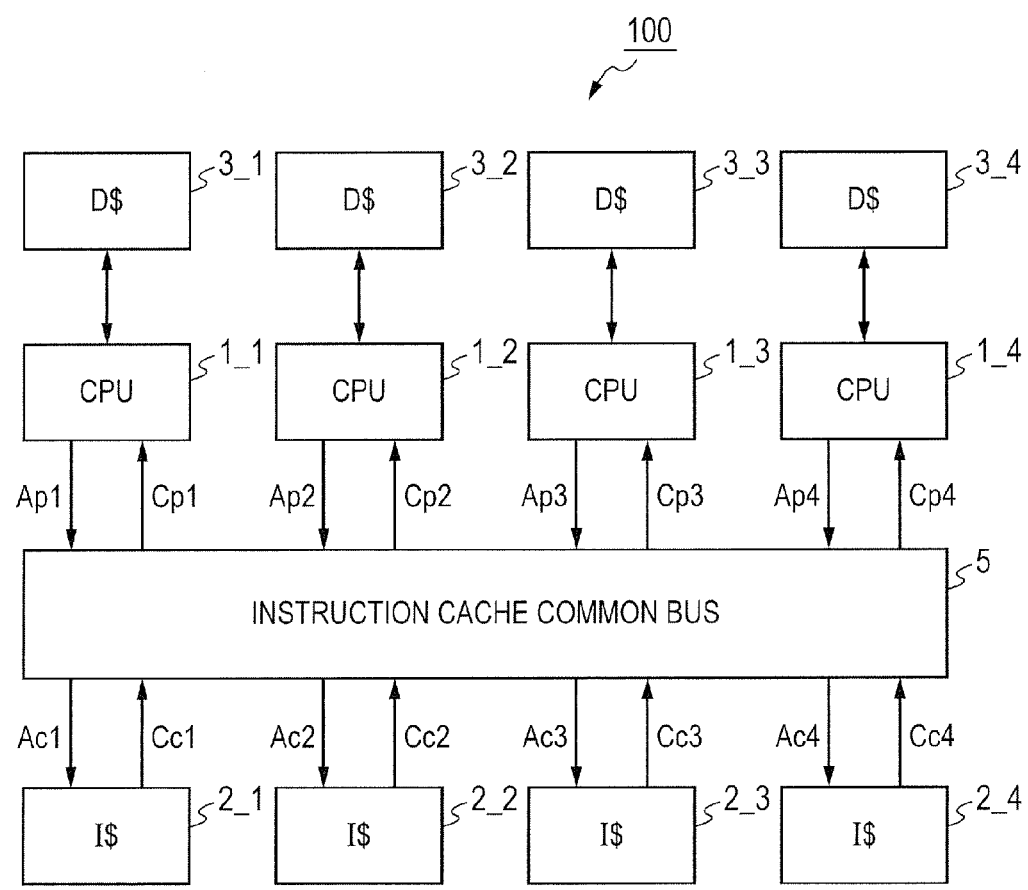
FIG. 1 is a block diagram showing a configuration example of a data processing device according to a first embodiment.

First, exemplary embodiments of the invention disclosed in the present application will be outlined. Reference numerals in the drawings that refer to with parentheses applied thereto in the outline description of the exemplary embodiments are merely illustration of ones contained in the concepts of components marked with the reference numerals.

[1] <Instruction Fetch from One Memory to Multiple CPUs>

A data processing device (100) according to an exemplary embodiment disclosed in the present application includes a plurality of CPUs (1_1 to 1_4) and a plurality of memories (2_1 to 2_4) corresponding to the CPUs, and is configured as follows.

When the CPUs issue requests for fetching instruction codes of different addresses from the corresponding memories, the instruction codes are supplied from the corresponding memories to the corresponding CPUs.

When the CPUs issue requests for fetching an instruction code of a same address from the corresponding memories, the instruction code read from one of the memories by one access to the same address is parallelly supplied to the CPUs.

Thereby, without degrading peak performance at the time of operating the CPUs independently, when the CPUs operate in the SIMD type, only one of the memories is accessed, thus making it possible to reduce power consumption required for memory access for instruction fetch.

[2] <Instruction Cache Common Bus>

In item 1, the memories are instruction cache memories (2_1 to 2_4), the data processing device further includes an instruction cache common bus (5), and the instruction cache common bus is coupled to the CPUs and the instruction cache memories.

When the CPUs issue requests for fetching instruction codes of different addresses, the instruction codes are supplied from the corresponding instruction cache memories to the corresponding CPUs.

When the CPUs issue requests for fetching an instruction code of a same address, the instruction code read from one of the instruction cache memories by one access to the address is parallelly supplied to the CPUs.

Thereby, without degrading peak performance at the time of operating the CPUs independently, when the CPUs operate in the SIMD type, only one of the instruction cache memories is accessed, thus making it possible to reduce power consumption required for access to the instruction cache memories for instruction fetch.

[3] <Some CPUs Operate in SIMD>

In item 2, when among the CPUs, M CPUs (1_1 to 1_3) issue requests for fetching an instruction code of a same address and the other N CPUs (1_4) issue requests for fetching instruction codes of addresses different from the same address (M and N are integers), the data processing device operates as follows.

The instruction code read from one of M instruction cache memories corresponding to the M CPUs by one access to the same address is parallelly supplied to the M CPUs, and from N instruction cache memories corresponding to the N CPUs, the corresponding instruction codes are supplied to the corresponding CPUs.

Thereby, there can coexist the M CPUs operating parallelly in the SIMD type and the N CPUs capable of operating parallelly and independently.

[4] <Mode Setting>

In item 3, the data processing device further includes a mode setting mechanism capable of specifying which CPUs of the plural CPUs function as the M CPUs.

With this, by managing the mode setting mechanism by a multitask OS or the like, it is possible to explicitly specify CPUs at the time of assigning media processing suitable for SIMD processing.

[5] <Monitoring of Fetch Address>

In item 3, the data processing device monitors addresses issued when the CPUs request instruction fetch, and specifies CPUs that request fetch of an instruction code of a same address, as the M CPUs.

Thereby, without providing the mode setting mechanism of item 4 or without causing the OS or the like to manage the mode setting mechanism, it is possible to dynamically and autonomously specify a plurality of (M) CPUs operating parallelly in the SIMD type.

[6] <Instruction Buffer>

In item 1, the memories are instruction cache memories (2_1 to 2_4), the data processing device further includes an instruction buffer (51), and the instruction buffer is coupled to the CPUs and the instruction cache memories.

When the CPUs issue requests for fetching an instruction code of a same address within a predetermined period, the instruction buffer supplies to the CPUs the instruction code read from one of the instruction cache memories by one access to the address.

When the CPUs issue requests for fetching instruction codes of different addresses within the predetermined period, the instruction buffer supplies the instruction codes from the corresponding instruction cache memories to the corresponding CPUs.

Thereby, a time delay among instruction fetches by the CPUs operating parallelly in the SIMD type can be absorbed to access only one of the instruction cache memories, thus making it possible to reduce power consumption required for access to the instruction cache memories for instruction fetch. The "predetermined period" is specified by the period (cycle) of a permissible time (cycle) delay among instruction fetches performed originally at the same time.

[7] <Some CPUs Operate in SIMD>

In item 6, when among the CPUs, M CPUs (1_1 to 1_3) issue requests for fetching an instruction code of a same address within the predetermined period and the other N CPUs (1_4) issue requests for fetching instruction codes of addresses different from the same address within the predetermined period (M and N are integers), the data processing device operates as follows.

The instruction code read from one of M instruction cache memories corresponding to the M CPUs by one access to the same address is supplied to the M CPUs, and from N instruction cache memories corresponding to the N CPUs, the corresponding instruction codes are supplied to the corresponding CPUs.

Thereby, there can coexist the M CPUs operating parallelly in the SIMD type and the N CPUs capable of operating parallelly and independently, which can further provide the effect of item 6.

[8] <Transition of Inactive Instruction Cache to Low Power Consumption Mode>

In any one of items 1 to 7, the data processing device causes an unaccessed memory (instruction cache memory) among the memories (instruction cache memories) (2_1 to 2_4) to shift to a low power consumption mode.

Thereby, it is possible to further reduce power consumption for memory access.

[9] <Instruction Decode Common Bus>

In item 1, the CPUs include calculation execution units (11_1 to 11_4) and instruction decode units (12_1 to 12_4) respectively, and the data processing device further includes an instruction decode common bus (8).

The instruction decode common bus is coupled to the calculation execution units (11_1 to 11_4) of the CPUs and the instruction decode units (12_1 to 12_4) of the CPUs.

When the CPUs issue requests for fetching instruction codes of different addresses, the instruction decode common bus supplies results of decoding the instruction codes from the corresponding instruction decode units to the corresponding calculation execution units.

When the CPUs issue requests for fetching an instruction code of a same address, the instruction decode common bus parallelly supplies a result of decoding, by one of the instruction decode units of the CPUs, the instruction code to the corresponding calculation execution units.

Thereby, without degrading peak performance at the time of operating the CPUs independently, when the CPUs operate parallelly in the SIMD type, only one of the instruction decoders of the CPUs is operated, thus making it possible to reduce power consumption required for decoding in addition to instruction fetch.

[10] <Transition of Inactive Instruction Decoder to Low Power Consumption Mode>

In item 9, the data processing device causes an instruction decode unit not performing instruction decoding among the instruction decode units to shift to a low power consumption mode.

Thereby, it is possible to further reduce power consumption for instruction decoding during the SIMD-type parallel operation.

[11] <Instruction Fetch from One Memory to Multiple CPUs (Common Bus)>

A data processing device (100) according to an exemplary embodiment disclosed in the present application includes a plurality of CPUs (1_1 to 1_4), a memory (7), and a common bus (6) for coupling the CPUs to the memory, and is configured as follows.

When the CPUs issue requests for fetching instruction codes of different addresses from the memory, the instruction codes from the corresponding addresses of the memory are sequentially supplied to the corresponding CPUs.

When the CPUs issue requests for fetching an instruction code of a same address from the memory, the instruction code read from the memory by one access to the same address is parallelly supplied to the CPUs.

Thereby, without degrading peak performance at the time of operating the CPUs independently, when the CPUs operate in the SIMD type, the frequency of access to the memory is reduced, thus making it possible to reduce power consumption. When the CPUs operate parallelly and independently, the common bus performs ordinary bus arbitration. When the CPUs operate in the SIMD type, the common bus parallelly supplies (broadcasts) the instruction code read by one access to the memory to the CPUs operating parallelly in the SIMD type.

[12] <Some CPUs Operate in SIMD>

In item 11, when among the CPUs, M CPUs (1_1 to 1_3) issue requests for fetching an instruction code of a same address and the other N CPUs (1_4) issue requests for fetching instruction codes of addresses different from the address (M and N are integers), the data processing device operates as follows.

The instruction code for fetch requested by the M CPUs is read from the memory by one access to the same address and parallelly supplied to the M CPUs, and the instruction codes for fetch requested by the N CPUs are sequentially read from the memory and sequentially supplied to the corresponding CPUs.

Thereby, there can coexist the M CPUs operating parallelly in the SIMD type and the N CPUs capable of operating parallelly and independently. The common bus performs ordinary bus arbitration on the N CPUs operating parallelly and independently, and the common bus parallelly supplies (broadcasts) the instruction code read by one access to the memory to the M CPUs operating parallelly in the SIMD type.

[13] <Mode Setting>

In item 12, the data processing device further includes a mode setting mechanism capable of specifying which CPUs of the plural CPUs function as the M CPUs.

With this, by managing the mode setting mechanism by the multitask OS or the like, it is possible to explicitly specify CPUs at the time of assigning media processing suitable for SIMD processing.

[14] <Monitoring of Fetch Address>

In item 12, the data processing device monitors addresses issued when the CPUs request instruction fetch, and specifies CPUs that request fetch of an instruction code of a same address, as the M CPUs.

Thereby, without providing the mode setting mechanism of item 13 or without causing the OS or the like to manage the mode setting mechanism, it is possible to dynamically and autonomously specify a plurality of (M) CPUs operating parallelly in the SIMD type.

[15] <Cache Fill from One Main Memory to Multiple I$>

A data processing device (100) according to an exemplary embodiment disclosed in the present application includes a plurality of CPUs (1_1 to 1_4), a plurality of instruction cache memories (2_1 to 2_4) respectively coupled to the CPUs, a main memory (7), and a common bus (6) for coupling the instruction cache memories to the main memory, and is configured as follows.

When the instruction cache memories issue requests for reading instruction codes of different addresses from the main memory, the instruction codes from the corresponding addresses of the main memory are sequentially supplied to the corresponding instruction cache memories.

When the instruction cache memories issue requests for reading an instruction code of a same address from the main memory, the instruction code read from the main memory by one access to the same address is parallelly supplied to the instruction cache memories.

Thereby, in the data processing device in which the CPUs having the respective instruction cache memories are coupled to the main memory through the common bus, without degrading peak performance at the time of operating the CPUs independently, the frequency of access to the main memory is reduced, thus making it possible to reduce power consumption. This is because when the CPUs operate parallelly in the SIMD type, cache fill associated with cache misses that occur at the same time in the instruction cache memories is parallelly performed from the main memory 7 to the instruction cache memories.

[16] <Some CPUs Operate in SIMD>

In item 15, the data processing device operates as follows. In the data processing device, M instruction cache memories respectively coupled to M CPUs among the plural CPUs issue requests for reading a set of instruction codes of a same address from the main memory for cache fill. Further, in the data processing device, the other N CPUs issue requests for reading sets of instruction codes, of different addresses, different from the same set of instruction codes, for cache fill. M and N are arbitrary integers. In this case, the data processing device operates as follows.

The set of instruction codes for cache fill requested by the M CPUs is read from the main memory by a set of access and parallelly supplied to the M CPUs, and the sets of instruction codes for cache fill requested by the N CPUs are sequentially read from the main memory and sequentially supplied to the corresponding instruction cache memories.

Thereby, there can coexist the M CPUs operating in the SIMD type and the N CPUs capable of operating parallelly and independently. When cache misses occur in the N CPUs operating parallelly and independently, through common bus arbitration, cache fill is performed on the corresponding instruction cache memories. On the other hand, when cache misses occur in the M CPUs operating in the SIMD type, as an exception to common bus arbitration, cache fill performed on the instruction cache memory corresponding to one of the M CPUs is parallelly performed on all the M instruction cache memories. This cache fill is the broadcast (parallel supply) of the set of instruction codes performed through common bus from the main memory.

[17] <Mode Setting>

In item 16, the data processing device further includes a mode setting mechanism capable of specifying which CPUs of the plural CPUs function as the M CPUs.

With this, by managing the mode setting mechanism by the multitask OS or the like, it is possible to explicitly specify CPUs at the time of assigning media processing suitable for SIMD processing.

[18] <Monitoring of Cache Fill Address>

In item 16, the data processing device monitors addresses issued when the instruction cache memories request cache fill, and specifies CPUs corresponding to instruction cache memories that request cache fill of an instruction code of a same address, as the M CPUs.

Thereby, without providing the mode setting mechanism of item 17 or without causing the OS or the like to manage the mode setting mechanism, it is possible to dynamically and autonomously specify a plurality of CPUs operating in the SIMD type.

2. Details of Embodiments

Embodiments will be described in greater detail below.

First Embodiment

<Instruction Cache Common Bus>

FIG. 1 is a block diagram showing a configuration example of a data processing device according to the first embodiment.

The data processing device 100 according to the first embodiment includes CPUs 1_1 to 1_4, instruction cache memories (I$) 2_1 to 2_4 and data cache memories (D$) 3_1 to 3_4 corresponding to the CPUs 1_1 to 1_4, and includes an instruction cache common bus 5 between the CPUs 1_1 to 1_4 and the instruction cache memories 2_1 to 2_4. These components are coupled via multibit digital signal interconnections, but bus notation is omitted in FIG. 1. The same applies to the other drawings in the present application.

The CPUs 1_1 to 1_4 issue addresses Ap1 to Ap4 for instruction fetch to the instruction cache common bus 5, respectively.

When the parallel-operating CPUs 1_1 to 1_4 operate independently in the MIMD type, the addresses Ap1 to Ap4 issued at the same time generally do not assume the same value, because the CPUs 1_1 to 1_4 execute different software programs. Even if the parallelly executed software programs call the same subroutine at the same time, instruction fetch based on the same address is not carried out unless the object code of the subroutine is shared. On the other hand, when the CPUs 1_1 to 1_4 operate parallelly in the SIMD type, all the addresses Ap1 to Ap4 are the same.

When the parallel-operating CPUs 1_1 to 1_4 operate in the MIMD type and issue requests for fetching instruction codes of different addresses from the corresponding instruction cache memories 2_1 to 2_4, the instruction cache common bus 5 supplies the instruction codes read from the corresponding instruction cache memories 2_1 to 2_4 to the corresponding CPUs 1_1 to 1_4. That is, the address Ap1 issued by the CPU 1_1 is transferred, as it is, as an address Ac1 for accessing the instruction cache memory 2_1, and an instruction code Cc1 read from the instruction cache memory 2_1 is inputted as it is as Cp1 to the CPU 1_1, fetched, and executed. The same applies to the CPUs 1_2 to 1_4 and the instruction cache memories 2_2 to 2_4. The addresses Ap2 to Ap4 issued by the CPUs 1_2 to 1_4 are transferred, as they are, as addresses Ac2 to Ac4 for the instruction cache memories 2_2 to 2_4, and instruction codes Cc2 to Cc4 read from the instruction cache memories 2_2 to 2_4 are fetched as they are as Cp2 to Cp4 to the CPUs 1_2 to 1_4, respectively.

On the other hand, when the CPUs 1_1 to 1_4 operate parallelly in the SIMD type and issue requests for fetching the instruction code of the same address, the instruction code read from one of the instruction cache memories 2_1 to 2_4 by one access to the same address is parallelly supplied to the CPUs 1_1 to 1_4 operating parallelly in the SIMD type. An operation example in this case will be described in greater detail.

Figure 2:
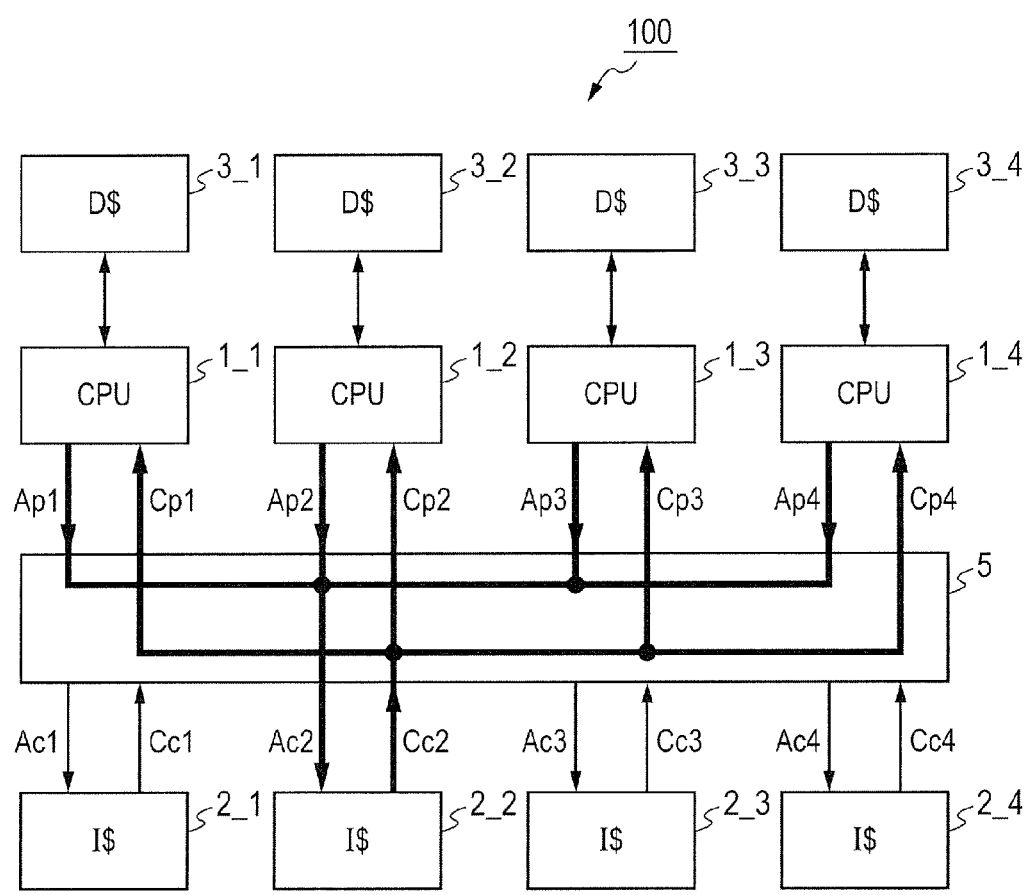
FIG. 2 is an explanation diagram showing an operation example in which all CPUs operate parallelly in an SIMD type in the data processing device according to the first embodiment.

FIG. 2 is an explanation diagram showing an example in which all the CPUs 1_1 to 1_4 operate parallelly in the SIMD type in the data processing device 100 shown in FIG. 1. Since the CPUs 1_1 to 1_4 operate parallelly in the SIMD type, all the addresses Ap1, Ap2, Ap3, Ap4 issued for instruction fetch by the CPUs 1_1 to 1_4 have the same value. For example, with this address as Ac2, the instruction cache common bus 5 accesses the instruction cache memory 2_2. Any instruction cache memory may be used. The accessed instruction cache memory 2_2 reads the corresponding instruction code Cc2, and supplies it to the instruction cache common bus 5. The instruction cache common bus 5 supplies the inputted instruction code Cc2 as it is as Cp1, Cp2, Cp3, Cp4 to the CPUs 1_1 to 1_4. The CPUs 1_1 to 1_4 fetch the supplied instruction code Cp1=Cp2=Cp3=Cp4=Cc2, and execute the same instruction.

Thereby, without degrading peak performance at the time of operating the CPUs independently, when the CPUs (1_1 to 1_4) operate in the SIMD type, only one (2_2) of the memories (2_1 to 2_4) is accessed, thus making it possible to reduce power consumption required for memory access for instruction fetch.

If among the memories, unaccessed memories other than the accessed memory shift to a low power consumption mode, it is possible to reduce the power consumption more effectively. As the low power consumption mode, for example, there can be adopted a method of shutting off power supply, lowering the supplied power supply voltage, shutting off the supply of a clock signal, or lowering the frequency of the supplied clock signal. DVFS (Dynamic Voltage and Frequency Scaling) control may be performed. The DVFS control is a system of dynamically controlling a power supply voltage and an operation frequency (clock frequency) in accordance with the operating state of a circuit, and in the case of suspending the operation of the circuit, the supply of a clock or power may be stopped.

While FIG. 2 shows the example in which all the CPUs 1_1 to 1_4 operate parallelly in the SIMD type, some CPUs may operate parallelly in the SIMD type, and the other CPUs may operate independently thereof. An operation example in this case will be described in greater detail.

Figure 3:
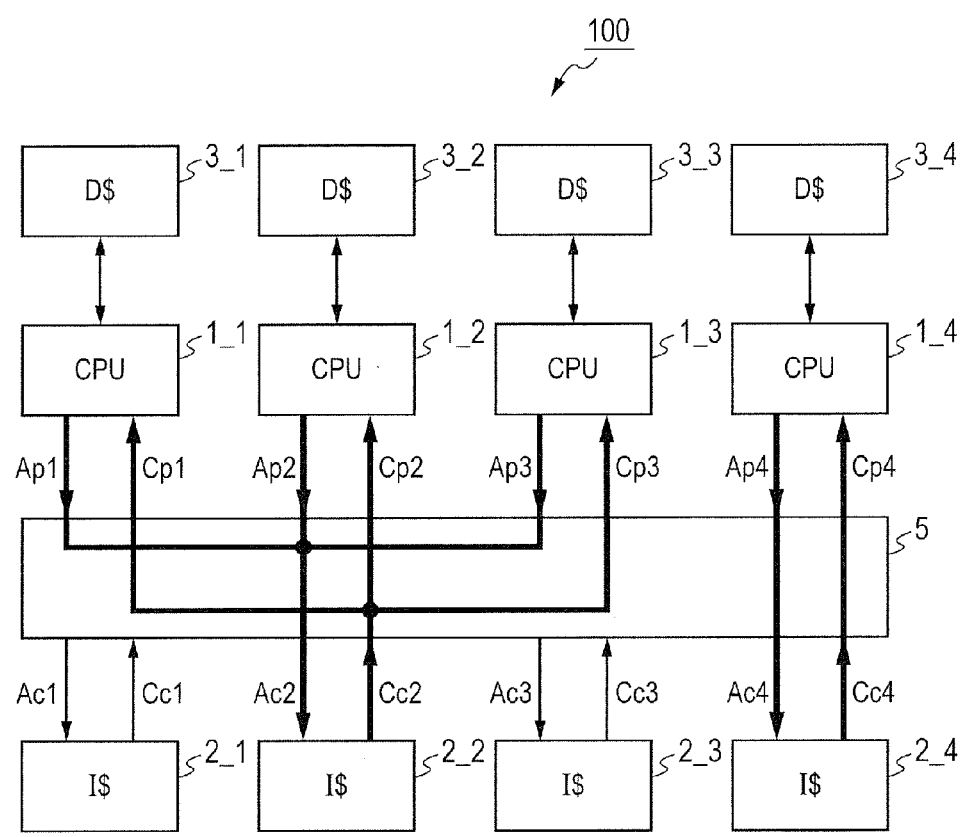
FIG. 3 is an explanation diagram showing an operation example in which some CPUs operate parallelly in the SIMD type in the data processing device according to the first embodiment.

FIG. 3 is an explanation diagram showing an operation example in which some CPUs (1_1 to 1_3) operate parallelly in the SIMD type in the data processing device 100 shown in FIG. 1. Among the CPUs 1_1 to 1_4, the CPUs 1_1 to 1_3 issue requests for fetching the instruction code of the same address, and the other CPU 1_4 issues a request for fetching the instruction code of an address different therefrom. That is, Ap1=Ap2=Ap3≠Ap4. The instruction cache common bus 5 parallelly supplies, to the CPUs 1_1 to 1_3, the instruction code read from one of the instruction cache memories 2_1 to 2_3 corresponding to the CPUs 1_1 to 1_3 by one access to the same address, and supplies the corresponding instruction code from the corresponding instruction cache memory 2_4 to the CPU 1_4 not operating in the SIMD type. That is, the instruction cache common bus 5 accesses, for example, the instruction cache memory 2_2, with Ap1=Ap2=Ap3 outputted from the CPUs 1_1 to 1_3 operating in the SIMD type as Ac2, and accesses the instruction cache memory 2_4, with Ap4 outputted from the CPU 1_4 operating independently as Ac4. The accessed instruction cache memory 2_2 reads the corresponding instruction code Cc2, and supplies Cc2 as it is as Cp1, Cp2, Cp3 through the instruction cache common bus 5 to the CPUs 1_1 to 1_3. The CPUs 1_1 to 1_3 fetch the supplied instruction code Cp1=Cp2=Cp3=Cc2, and execute the same instruction. On the other hand, the accessed instruction cache memory 2_4 reads the corresponding instruction code Cc4, and supplies Cc4 as it is as Cp4 through the instruction cache common bus 5 to the CPU 1_4. The CPU 1_4 fetches the supplied instruction code Cp4=Cc4, and executes, in parallel with the SIMD operation, the instruction different from the SIMD-type parallel operation by the CPUs 1_1 to 1_3.

The number of SIMD-operating CPUs and the number of other CPUs are arbitrary, regardless of the above example. That is, there can coexist M CPUs operating parallelly in the SIMD type and N CPUs capable of operating parallelly and independently (M and N are arbitrary integers). Further, there can also coexist a plurality of groups of CPUs operating parallelly in the SIMD type.

While FIGS. 1 to 3 show the instruction cache memories (I$) 2_1 to 2_4 and the data cache memories (D$) 3_1 to 3_4 coupled to the CPUs 1_1 to 1_4, a main memory etc. for filling these cache memories are not illustrated. It is possible to include a main memory or a secondary cache memory and a cache controller coupled in common to the instruction cache memories 2_1 to 2_4 and the data cache memories 3_1 to 3_4. Alternatively, it is possible to include a main instruction memory (secondary instruction cache memory) and an instruction cache controller coupled to the instruction cache memories 2_1 to 2_4 and a main data memory (secondary data cache memory) and a data cache controller coupled to the data cache memories 3_1 to 3_4 by separating instructions and data. Alternatively, instead of the data cache memories 3_1 to 3_4, local data memories without the cache function can be coupled to the respective CPUs 1_1 to 1_4. Any hierarchical structure of the above memories and any hierarchical structure of buses for coupling the memories may be adopted.

Figure 4:
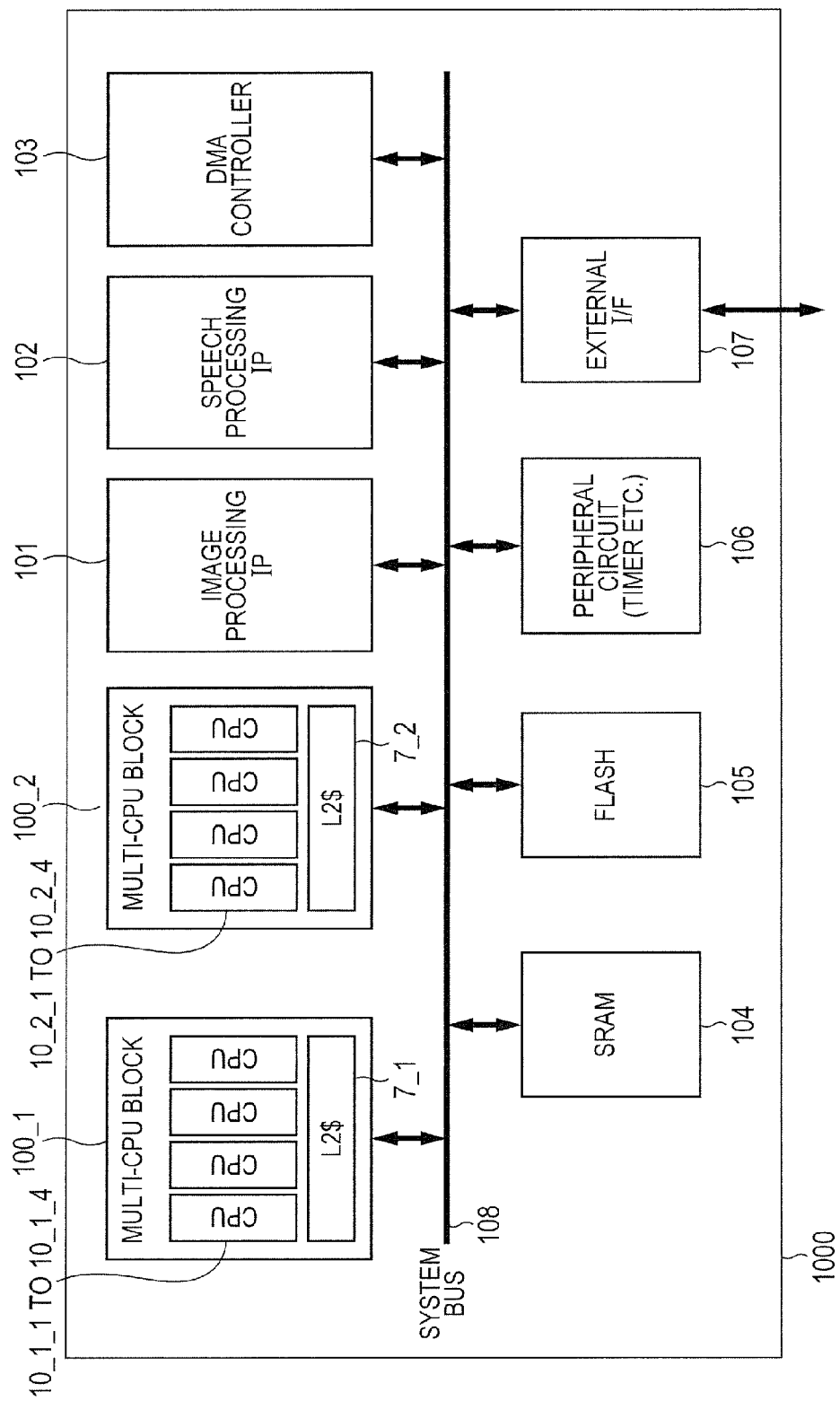
FIG. 4 is a block diagram showing a configuration example of a media processing system based on the data processing device.

FIG. 4 is a block diagram showing a configuration example of a media processing system 1000 based on the data processing device 100. The media processing system 1000 includes two multi-CPU blocks 100_1 and 100_2, image processing IP 101, speech processing IP 102, a DMA controller 103, an SRAM 104, a flash memory (Flash) 105, a peripheral circuit 106 such as a timer etc., an external interface (I/F) 107, and a system bus 108 for interconnecting these units.

The multi-CPU blocks 100_1 and 100_2 are each obtained by implementing the data processing device 100. The details will be described later.

The image processing IP (Intellectual Property) 101 and the speech processing IP 102 are dedicated IPs for performing image processing and speech processing, respectively. The DMA (Direct Memory Access) controller 103 is a control circuit block for transferring data between memories without passing through the CPU. The SRAM (Static Random Access Memory) 104 and the flash memory (Flash) 105 are volatile and nonvolatile memories, respectively. The SRAM 104 mainly stores intermediate data and status, and the flash memory 105 stores constant data and instruction codes of programs executed by the multi-CPU blocks 100_1 and 100_2. The peripheral circuit 106 is a peripheral circuit block such as a timer etc., and is selectively included as appropriate in accordance with a functional specification provided by the media processing system 1000. The external interface (I/F) 107 is a communication interface with the outside, and is a function module for providing a network interface and a human-machine interface for input/output of images and speech or an interface circuit for connection with these function modules.

Although not restricted, the media processing system 1000 is an SOC (System On Chip). For example, the media processing system 1000 is formed over a single semiconductor substrate made of e.g. silicon, using a known CMOS (Complementary Metal-Oxide-Semiconductor field effect transistor) LSI (Large Scale Integrated circuit) manufacturing technology.

The multi-CPU blocks 100_1 and 100_2 will be described in detail.

Figure 5:
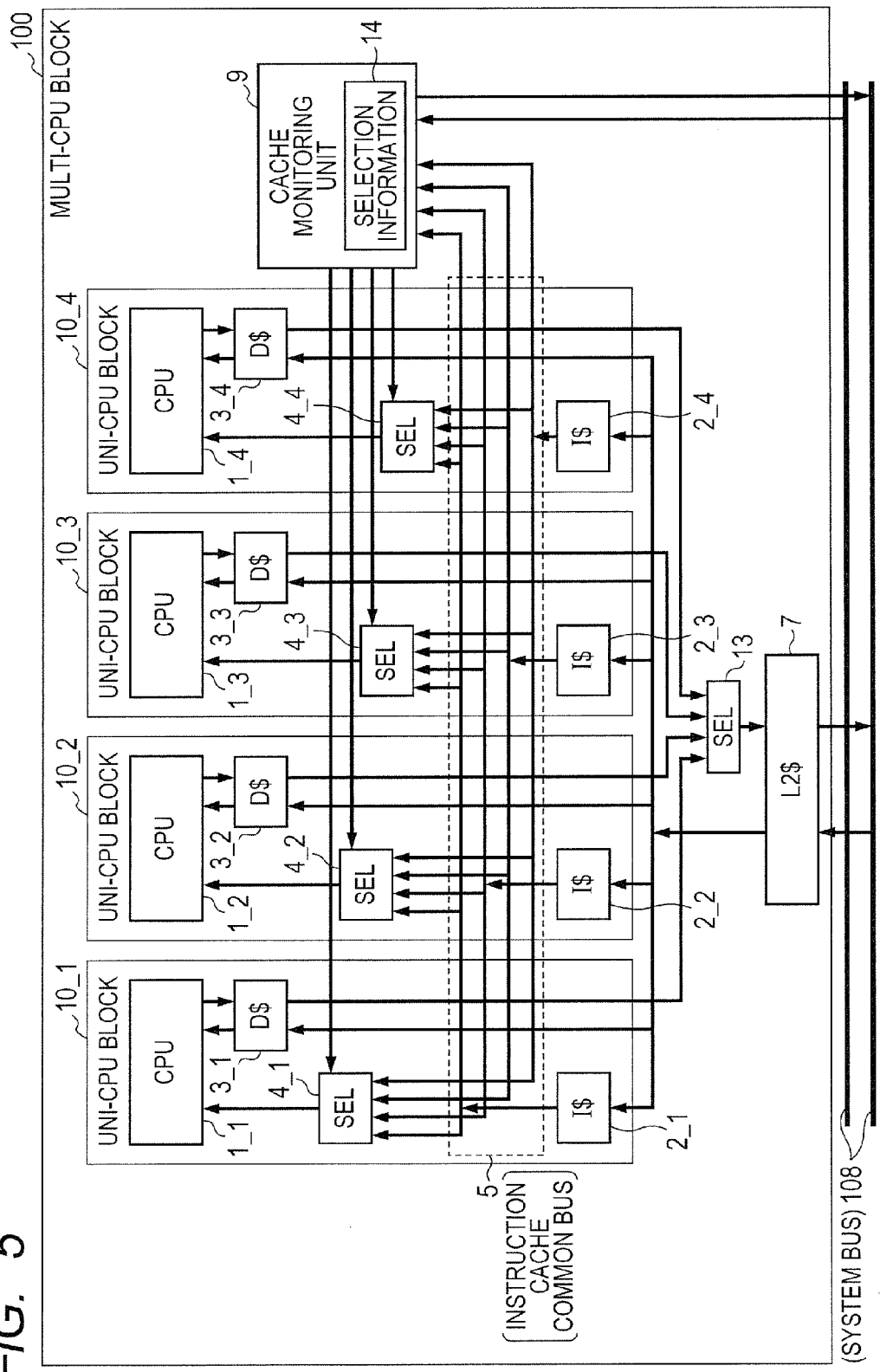
FIG. 5 is a block diagram showing a configuration example of a multi-CPU block included in the media processing system.

FIG. 5 is a block diagram showing a configuration example of the multi-CPU block included in the media processing system 1000. The multi-CPU blocks 100_1 and 100_2 are obtained by implementing the data processing device, and do not necessarily need to have the same configuration. FIG. 5 shows one configuration example of the multi-CPU block 100.

The multi-CPU block 100 includes a plurality of (e.g., four) uni-CPU blocks 10_1 to 10_4 each including the CPU, the instruction cache memory, and the data cache memory, a secondary cache memory 7, a cache monitoring unit 9, and a selector 13. The uni-CPU blocks 10_1 to 10_4 include the CPUs 1_1 to 1_4, the instruction cache memories (I$) 2_1 to 2_4, and the data cache memories (D$) 3_1 to 3_4, respectively. The instruction cache memories 2_1 to 2_4 are each coupled not only to one CPU in one uni-CPU block 10 but also to the CPUs 1_1 to 1_4 included in the other uni-CPU blocks 10 in the same multi-CPU block 100 through the instruction cache common bus 5 and instruction cache selectors 4_1 to 4_4. That is, the instruction cache common bus 5 is comprised of four buses coupled to the instruction cache memories 2_1 to 2_4, and the instruction cache selectors 4_1 to 4_4 select one of the four buses, thereby controlling the coupling relationship between the corresponding CPUs 1_1 to 1_4 and instruction cache memories 2_1 to 2_4. The cache monitoring unit 9 has the function of monitoring the transactions of the instruction cache memories 2_1 to 2_4 in the uni-CPU blocks 10_1 to 10_4, the function of storing selection information 14 of the instruction cache selectors 4_1 to 4_4, and the function of outputting the selection information 14. On the other hand, the data cache memories 3_1 to 3_4 are coupled only to the corresponding CPUs 1_1 to 1_4 in the uni-CPU blocks 10_1 to 10_4 respectively, but not coupled to the other CPUs even in the same multi-CPU block 100. Further, the instruction cache memories 2_1 to 2_4 and the data cache memories 3_1 to 3_4 are coupled to the secondary cache memory 7 in the same multi-CPU block 100, and the secondary cache memory 7 is coupled to the system bus 108 outside the multi-CPU block 100. The selection information 14 in the cache monitoring unit 9 is stored in e.g. a register, and can be read and written through the system bus 108.

While FIG. 4 shows the configuration example including the data processing devices (multi-CPU blocks) 100_1 and 100_2 of the same configuration, an arbitrary number of multi-CPU blocks can be included (implemented) in the media processing system 1000. Further, while FIG. 5 illustrates the multi-CPU block 100 including the four uni-CPU blocks 10_1 to 10_4, the number of included (implemented) uni-CPU blocks can be changed as appropriate.

<Mode Setting by OS>

The control (mode setting) of the instruction cache selectors 4_1 to 4_4, that is, the setting of which CPU 1_1 to 1_4 uses which instruction cache memory 2_1 to 2_4 is determined by the OS (Operating System) or a user (hereinafter, called OS), and the result is written to the selection information 14 in the cache monitoring unit 9 for switching.

A specific procedure will be described below.

In the case where the CPUs 1_1 to 1_4 execute a plurality of applications, the OS determines, for switching, which application is assigned to which CPU. The OS assigns a plurality of applications to a plurality of CPUs by time sharing, based on information such as the number of CPUs to be used for SIMD-type parallel processing of each application, the required amount of calculation (amount of processing), timings to start and end the calculation (processing), and the interdependent relationship of data and control information between applications.

When an application suitable for SIMD-type parallel processing is assigned to a plurality of CPUs, the CPUs enter the SIMD mode of executing the same instruction. As a result, all the four CPUs might enter the SIMD mode, or three of the four CPUs might enter the SIMD mode and the other one might execute a different application independently. For example, in image processing, in the case of performing the same processing on data of each color in a state where color image information is separated into the three primary colors of RGB, three CPUs operate parallelly in the SIMD type, whereas the other CPU can operate the OS. In such a case, the OS writes appropriate selection information 14 to the cache monitoring unit 9 so that the three CPUs in the SIMD mode are coupled to a common instruction cache memory. The OS changes the assignment of applications to the CPUs 1_1 to 1_4 with proper timing, using a function such as the timer, and updates the selection information 14 in the cache monitoring unit 9 accordingly. As a result, all CPUS might exit the SIMD mode, or a new combination of CPUs might enter the SIMD mode. At this time, the OS performs the DVFS control on the instruction cache memories 2_1 to 2_4, thereby to lower or shut off the power supply voltage supplied to instruction cache memories not in use and to lower or shut off the frequency of the supplied clock, thereby further reducing power consumption.

<Mode Setting by Monitoring Fetch Address>

The mode setting by OS has been described above. In this case, the OS performs control as to which application is assigned to which CPU with which timing. To implement this, it is necessary that the OS performs scheduling using information of each application. On the other hand, instead of the detail control by the OS, by monitoring the transactions of the instruction cache memories 2_1 to 2_4, the cache monitoring unit 9 can autonomously extract CPUs operating parallelly in the SIMD type, and based on the result, appropriately updates the selection information 14 in the cache monitoring unit 9, for mode setting. That is, the cache monitoring unit 9 always monitors the transactions of the instruction cache memories 2_1 to 2_4, and when the CPUs 1_1 to 1_4 fetch the instruction of the same address with the same timing, changes the selection information 14 in the cache monitoring unit 9 into the SIMD mode of supplying the instruction from one instruction cache memory 2 to the CPUs.

The configuration in the SIMD mode is the same as in the "mode setting by OS". All (e.g., four) CPUs might enter the SIMD mode (see FIG. 2), or some (e.g., three) CPUs might enter the SIMD mode (see FIG. 3). In the same way as in the "mode setting by OS", the power consumption can be reduced by performing the DVFS control on the instruction cache memories 2_1 to 2_4.

The transactions of the cache memories are always monitored; accordingly, the selection information 14 in the cache monitoring unit 9 is also always updated. As a result, all CPUS might exit the SIMD mode, or a new combination of CPUs might enter the SIMD mode.

Second Embodiment

<Common Bus (Switching and Coexistence of Bus Arbitration/Broadcast)>

Figure 6:
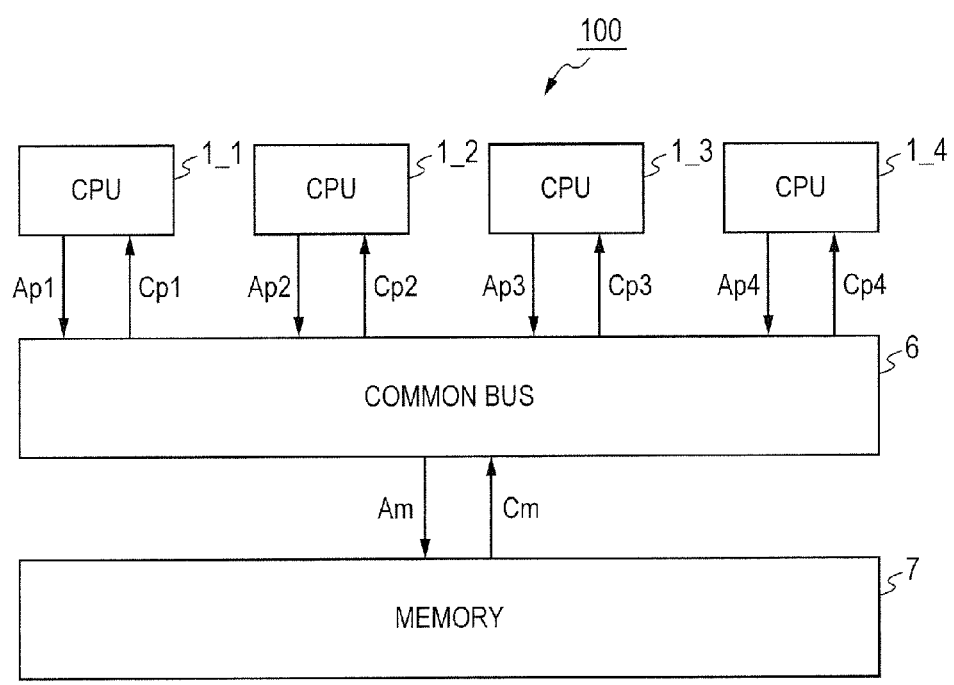
FIG. 6 is a block diagram showing a configuration example of a data processing device according to a second embodiment.

FIG. 6 is a block diagram showing a configuration example of a data processing device 100 according to the second embodiment.

In the data processing device 100 according to the second embodiment, the four CPUs 1_1 to 1_4 are coupled to a memory 7 through a common bus 6. The four CPUs 1_1 to 1_4 output the addresses Ap1 to Ap4 for instruction fetch, thereby to make requests to the common bus 6 for bus rights. In the common bus 6, a bus arbitration circuit (not shown) performs arbitration based on predetermined priorities. In order in which the CPUs acquire the bus right, an address Am is issued to the memory 7, and an instruction code Cm is read and fetch. When some or all of the four CPUs 1_1 to 1_4 operate parallelly in the SIMD type, in the second embodiment, the common bus 6 makes only one access to an address requested by the CPUs operating in the SIMD type, and parallelly supplies (broadcasts) the read instruction code Cm to the CPUs which have requested it.

Figure 7:
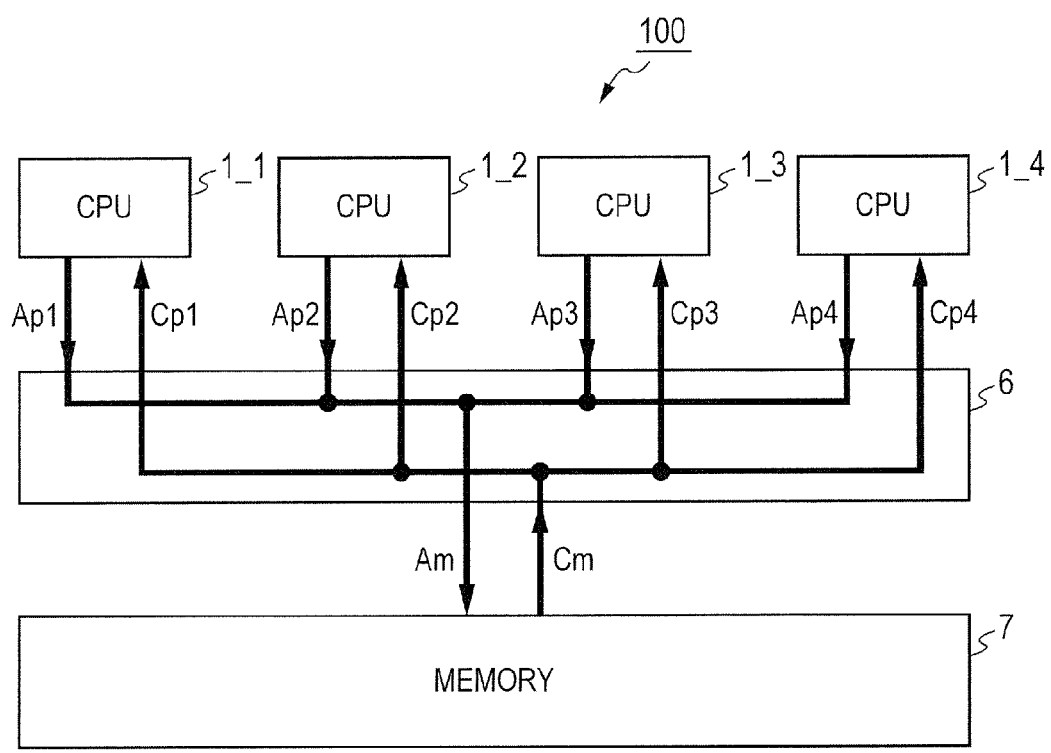
FIG. 7 is an explanation diagram showing an operation example in which all CPUs operate parallelly in the SIMD type in the data processing device according to the second embodiment.

FIG. 7 is an explanation diagram showing an operation example in which all the four CPUs 1_1 to 1_4 operate parallelly in the SIMD type in the data processing device 100 shown in FIG. 6. Since the CPUs 1_1 to 1_4 operate parallelly in the SIMD type, all the addresses Ap1, Ap2, Ap3, Ap4 issued for instruction fetch by the CPUs 1_1 to 1_4 have the same value. With this address as Am, the common bus 6 accesses the memory 7. The accessed memory 7 reads the corresponding instruction code Cm, and outputs it to the common bus 6. The common bus 6 parallelly supplies the inputted instruction code Cm as it is as Cp1, Cp2, Cp3, Cp4 to the CPUs 1_1 to 1_4. The CPUs 1_1 to 1_4 fetch the parallelly supplied instruction code Cp1=Cp2=Cp3=Cp4=Cm, and execute the same instruction.

Thereby, without degrading peak performance at the time of operating the CPUs independently, when the CPUs operate in the SIMD type, the frequency of access to the memory 7 is reduced, thus making it possible to reduce power consumption. When the CPUs operate parallelly and independently, the common bus performs ordinary bus arbitration. When the CPUs operate in the SIMD type, the common bus parallelly supplies (broadcasts) the instruction code read by one access to the memory to the CPUs operating parallelly in the SIMD type.

Figure 8:
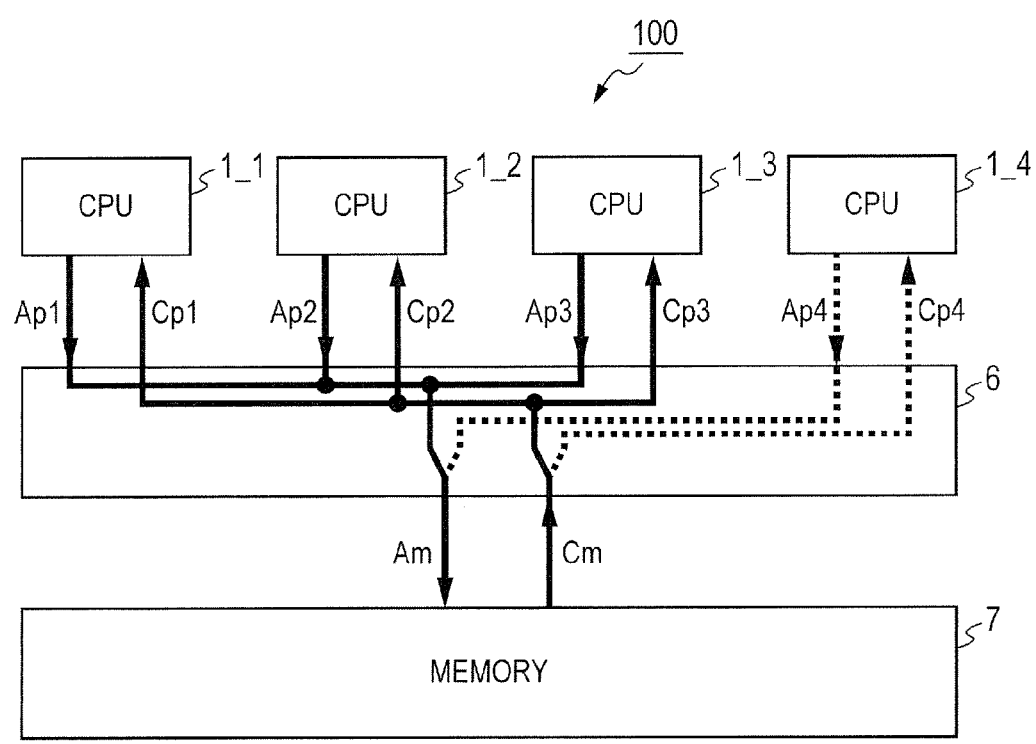
FIG. 8 is an explanation diagram showing an operation example in which some CPUs operate parallelly in the SIMD type in the data processing device according to the second embodiment.

FIG. 8 is an explanation diagram showing an operation example in which some CPUs operate parallelly in the SIMD type in the data processing device 100 shown in FIG. 6. Among the CPUs, the three CPUs 1_1 to 1_3 operate parallelly in the SIMD type and issue requests for fetching the instruction code of the same address, and the other CPU 1_4 issues a request for fetching the instruction code of an address different from the foregoing address. The instruction code for fetch requested by the three CPUs operating parallelly in the SIMD type is read from the memory 7 by one access to the same address, and the read instruction code is parallelly supplied to the three CPUs. The instruction code for fetch requested by the other CPU is read from the memory 7 with timing that does not conflict with the one access, and the read instruction code is sequentially supplied to the corresponding CPU. The addresses Ap1, Ap2, Ap3 issued by the three CPUs 1_1 to 1_3 operating parallelly in the SIMD type shown in FIG. 8 have the same value, and the address Ap4 issued by the CPU 1_4 is different therefrom (Ap1=Ap2=Ap3≠Ap4). As shown by thick lines in FIG. 8, the memory 7 is accessed with Am=Ap1=Ap2=Ap3, and the read Cm is parallelly supplied (broadcast) to the CPUs 1_1 to 1_3. With different timing arbitrated so as not to conflict with the memory access, as shown by dashed lines in FIG. 8, the memory 7 is accessed with Am=Ap4, and the read Cm is supplied as Cp4 to the CPU 1_4.

The number of SIMD-operating CPUs and the number of other CPUs are arbitrary, regardless of the above example. When among the CPUs, M CPUs issue requests for fetching the instruction code of the same address and the other N CPUs issue requests for fetching instruction codes of different addresses (M and N are integers), the data processing device 100 operates as follows. That is, the instruction code of the same address for fetch requested by the M CPUs is read from the memory 7 by one access, and the read instruction code is parallelly supplied (broadcast) to the M CPUs operating in the SIMD type. The instruction codes of different addresses for fetch requested by the other N CPUs are sequentially read from the memory 7, and the read instruction codes are sequentially supplied to the corresponding CPUs.

Thereby, there can coexist the M CPUs operating in the SIMD type and the N CPUs capable of operating parallelly and independently. The common bus performs ordinary bus arbitration on the N CPUs operating parallelly and independently, and the common bus broadcasts the instruction code read by one access to the memory to the M CPUs operating in the SIMD type.

<Mode Setting>

In the second embodiment, the data processing device 100 can include a mode setting mechanism capable of specifying which CPUs of the plural CPUs function as the M CPUs operating in the SIMD type, in the bus arbitration circuit of the common bus 6. When the CPUs operating in the SIMD type specified by the mode setting mechanism issue requests for access to the same address at the same time, the arbitration among these access requests is not performed, only one access to the memory 7 based on the same address is performed, and the result is parallelly supplied (broadcast) to the specified CPUs. Bus arbitration is performed between the access and another access request.

With this, by managing the mode setting mechanism by the multitask OS or the like, it is possible to explicitly specify CPUs at the time of assigning media processing suitable for SIMD processing.

<Monitoring of Fetch Address>

In the second embodiment, the data processing device 100 always monitors addresses issued when the CPUs request instruction fetch, and specifies CPUs that request the fetch of the instruction code of the same address at the same time, as the M CPUs operating in the SIMD type. As for the specified CPUs, in the same way as in the "mode setting", the arbitration among the access requests for fetching the instruction code of the same address is not performed, only one access to the memory 7 based on the same address is performed, and the thereby read instruction code is broadcast to the specified CPUs. Bus arbitration is performed between the access request and another access request.

Thereby, without causing the OS or the like to manage the mode setting mechanism or without needing to provide the complicated mode setting mechanism, it is possible to dynamically and autonomously specify a plurality of (M) CPUs operating in the SIMD type.

Third Embodiment

<Parallel Cache Fill by Broadcast>

Figure 9:
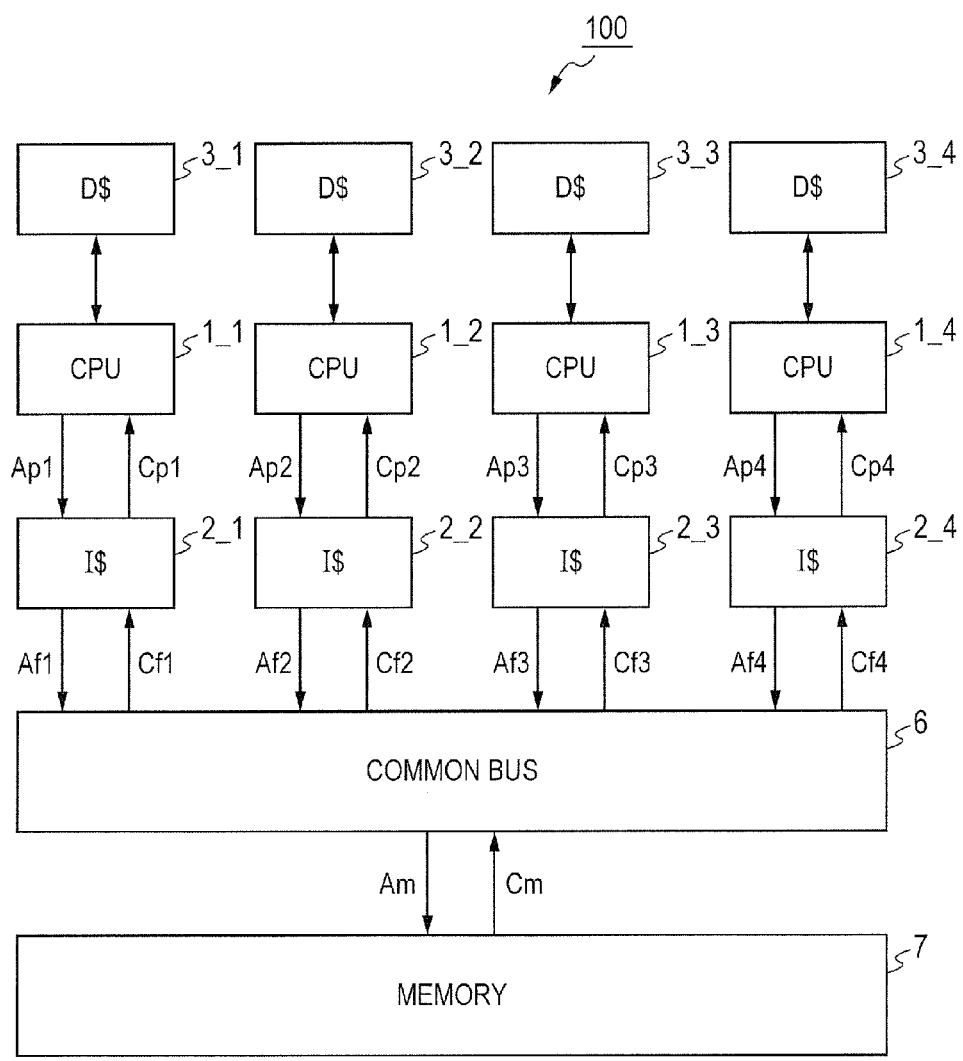
FIG. 9 is a block diagram showing a configuration example of a data processing device according to a third embodiment.

FIG. 9 is a block diagram showing a configuration example of a data processing device 100 according to the third embodiment.

The data processing device 100 according to the third embodiment includes the CPUs 1_1 to 1_4, the instruction cache memories (I$) 2_1 to 2_4 and the data cache memories (D$) 3_1 to 3_4 corresponding to the CPUs 1_1 to 1_4, the common bus 6, and the main memory 7.

The CPUs 1_1 to 1_4 issue addresses Ap1 to Ap4 for instruction fetch to the corresponding instruction cache memories 2_1 to 2_4 respectively, and the instruction cache memories 2_1 to 2_4 supply instruction codes Cp1 to Cp4 for operation. When a cache miss occurs in any of the instruction cache memories 2_1 to 2_4, the corresponding cache fill address Af1 to Af4 is issued to the common bus 6, and access to the main memory 7 is requested. The main memory 7 is accessed, with the address of the access request that has acquired a bus right by bus arbitration as Am, and data (instruction code) Cm for cache fill is read and supplied to the instruction cache memory that has issued the access request that has acquired the bus right.

Figure 10:
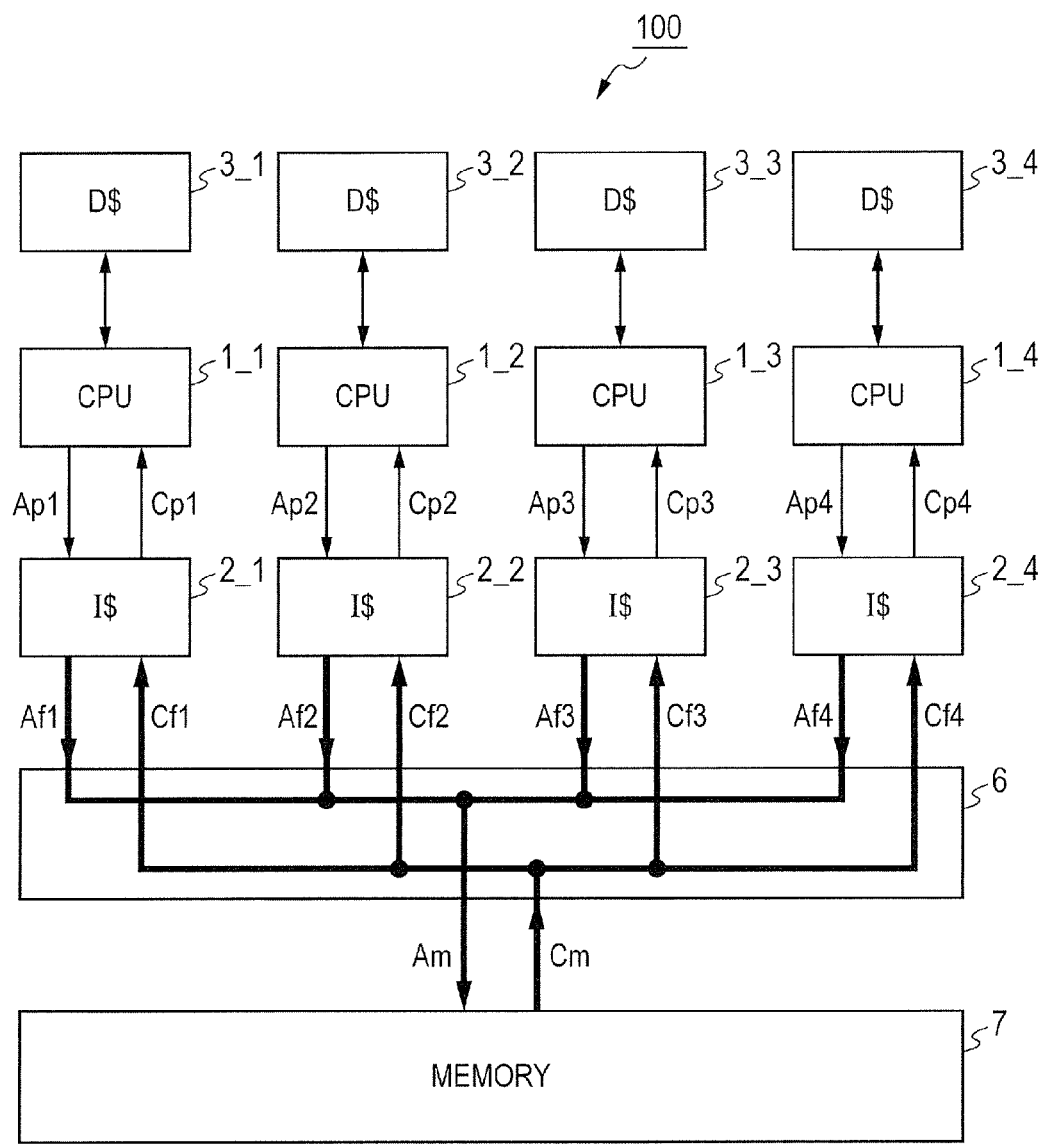
FIG. 10 is an explanation diagram showing an operation example in which all CPUs operate parallelly in the SIMD type in the data processing device according to the third embodiment.

FIG. 10 is an explanation diagram showing an operation example in which all CPUs operate parallelly in the SIMD type in the data processing device 100 shown in FIG. 9. In the case where all CPUs operate parallelly in the SIMD type, the addresses Ap1 to Ap4 issued for instruction fetch have the same value, the read instruction codes Cp1 to Cp4 have the same value, and cache misses in the instruction cache memories 2_1 to 2_4 occur at the same time. When the instruction cache memories 2_1 to 2_4 issue requests for reading the same instruction code from the main memory 7 at the occurrence of cache misses, the instruction code read from the main memory 7 by one access is parallelly supplied (broadcast) to the instruction cache memories 2_1 to 2_4. That is, only one access to the main memory 7 is made based on Am=Af1=Af2=Af3=Af4, and the read Cm is parallelly supplied (broadcast) to the instruction cache memories 2_1 to 2_4, with Cm=Cf1=Cf2=Cf3=Cf4. In this context, "only one access to the main memory 7" refers to the reading of a set of instruction codes from the main memory 7 based on a set of addresses necessary for cache fill, but does not mean the sequential cache fill to the instruction cache memories.

Thereby, in the data processing device in which the CPUs having the respective instruction cache memories are coupled to the main memory through the common bus, without degrading peak performance at the time of operating the CPUs independently, the frequency of access to the main memory is reduced, thus making it possible to reduce power consumption, because when the CPUs operate in the SIMD type, cache fill associated with cache misses that occur at the same time in the instruction cache memories is parallelly performed from the main memory 7 to the instruction cache memories.

Figure 11:
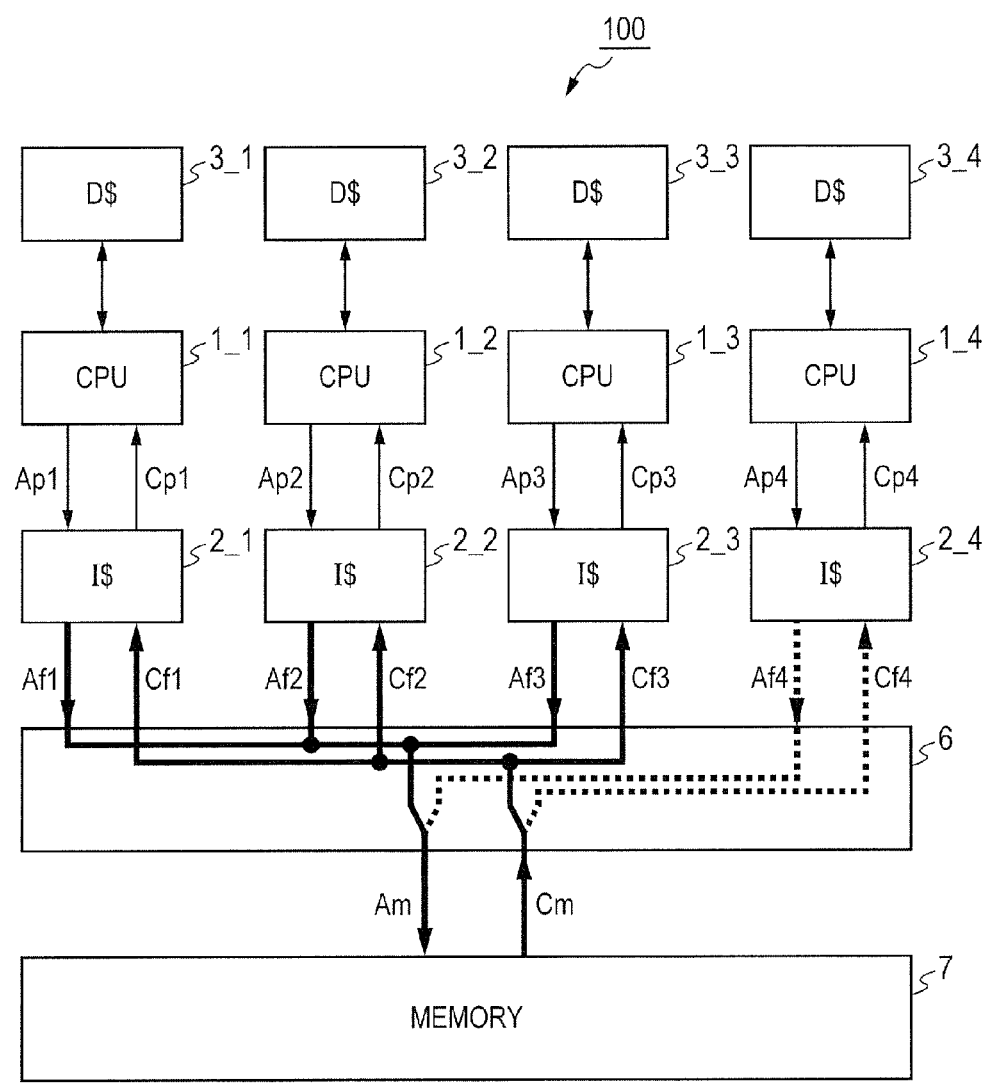
FIG. 11 is an explanation diagram showing an operation example in which some CPUs operate parallelly in the SIMD type in the data processing device according to the third embodiment.

FIG. 11 is an explanation diagram showing an operation example in which some CPUs operate parallelly in the SIMD type in the data processing device 100 shown in FIG. 9. Among the CPUs, the three CPUs 1_1 to 1_3 operate parallelly in the SIMD type, and fetch the instruction code of the same address from the instruction cache memories 2_1 to 2_3 to execute the same instruction. The other CPU 1_4 fetches and executes the instruction code of an address different from the foregoing address from the instruction cache memory 2_4. In the instruction cache memories 2_1 to 2_3 corresponding to the three CPUs 1_1 to 1_3 operating parallelly in the SIMD type, cache misses occur at the same time, and in the instruction cache memory 2_4 corresponding to the CPU 1_4, a cache miss occurs independently thereof. The cache misses that occur at the same time in the instruction cache memories 2_1 to 2_3 corresponding to the three CPUs 1_1 to 1_3 operating parallelly in the SIMD type request the same cache fill address at the same time (Af1=Af2=Af3). At this time, as shown by thick lines in FIG. 11, with Am=Af1=Af2=Af3, a set of instruction codes Cm necessary for cache fill is read only one time from the main memory 7, and parallelly supplied (broadcast) to the instruction cache memories 2_1 to 2_3. For the cache miss that occurs in the instruction cache memory 2_4 corresponding to the CPU 1_4, a set of instruction codes Cm necessary for cache fill is read from the main memory 7 with Am=Af4, and supplied to the instruction cache memory 2_4, as shown by dashed lines in FIG. 11.

The number of SIMD-operating CPUs and the number of other CPUs are arbitrary, regardless of the above example. When M instruction cache memories coupled to M CPUs among the plural CPUs issue requests for reading the same set of instruction codes from the main memory for cache fill and the other N CPUs issue requests for reading other sets of instruction codes for cache fill (M and N are arbitrary integers), the data processing device 100 operates as follows. The set of instruction codes for cache fill requested by the M CPUs operating in the SIMD type is read from the main memory by a set of access and parallelly supplied to the M CPUs operating in the SIMD type. The sets of instruction codes for cache fill requested by the other N CPUs not operating in the SIMD type are sequentially read from the main memory and sequentially supplied to the corresponding instruction cache memories.

Thereby, there can coexist the M CPUs operating in the SIMD type and the N CPUs capable of operating parallelly and independently. When cache misses occur in the N CPUs operating parallelly and independently, through common bus arbitration, cache fill is performed on the corresponding instruction cache memories. On the other hand, when cache misses occur in the M CPUs operating in the SIMD type, as an exception to common bus arbitration, cache fill performed on the instruction cache memory corresponding to one of the M CPUs is parallelly performed on all the M instruction cache memories. This cache fill is the broadcast of the set of instruction codes performed through common bus from the main memory.

<Mode Setting>

In the third embodiment, the data processing device 100 can include a mode setting mechanism capable of specifying which CPUs of the plural CPUs function as the M CPUs operating in the SIMD type, in the bus arbitration circuit of the common bus 6. When the access requests of the same cache fill address are issued at the same time from the instruction cache memories corresponding to the CPUs operating in the SIMD type specified by the mode setting mechanism, the arbitration among these access requests is not performed. Only one cache fill from the main memory 7 based on the same cache fill address is performed, and the result is simultaneously and parallelly provided as cache fill to the specified instruction cache memories. Bus arbitration is performed between the access and another access request.

With this, by managing the mode setting mechanism by the multitask OS or the like, it is possible to explicitly specify CPUs at the time of assigning media processing suitable for SIMD processing.

<Monitoring of Fetch Address>

In the third embodiment, the data processing device 100 always monitors cache fill addresses requested by the instruction cache memories, and specifies CPUs corresponding to instruction cache memories that request the cache fill of the same address, as the M CPUs operating in the SIMD type. As for the specified CPUs, in the same way as in the "mode setting", the arbitration among the access requests for the simultaneous cache fill based on the same address is not performed, only one cache fill from the main memory 7 based on the same address is performed, and the thereby read instruction code is broadcast to the specified instruction cache memories. Bus arbitration is performed between the access request and another access request.

Thereby, without causing the OS or the like to manage the mode setting mechanism or without needing to provide the complicated mode setting mechanism, it is possible to dynamically and autonomously specify a plurality of (M) CPUs operating in the SIMD type.

Fourth Embodiment

<Instruction Buffer>

Figure 12:
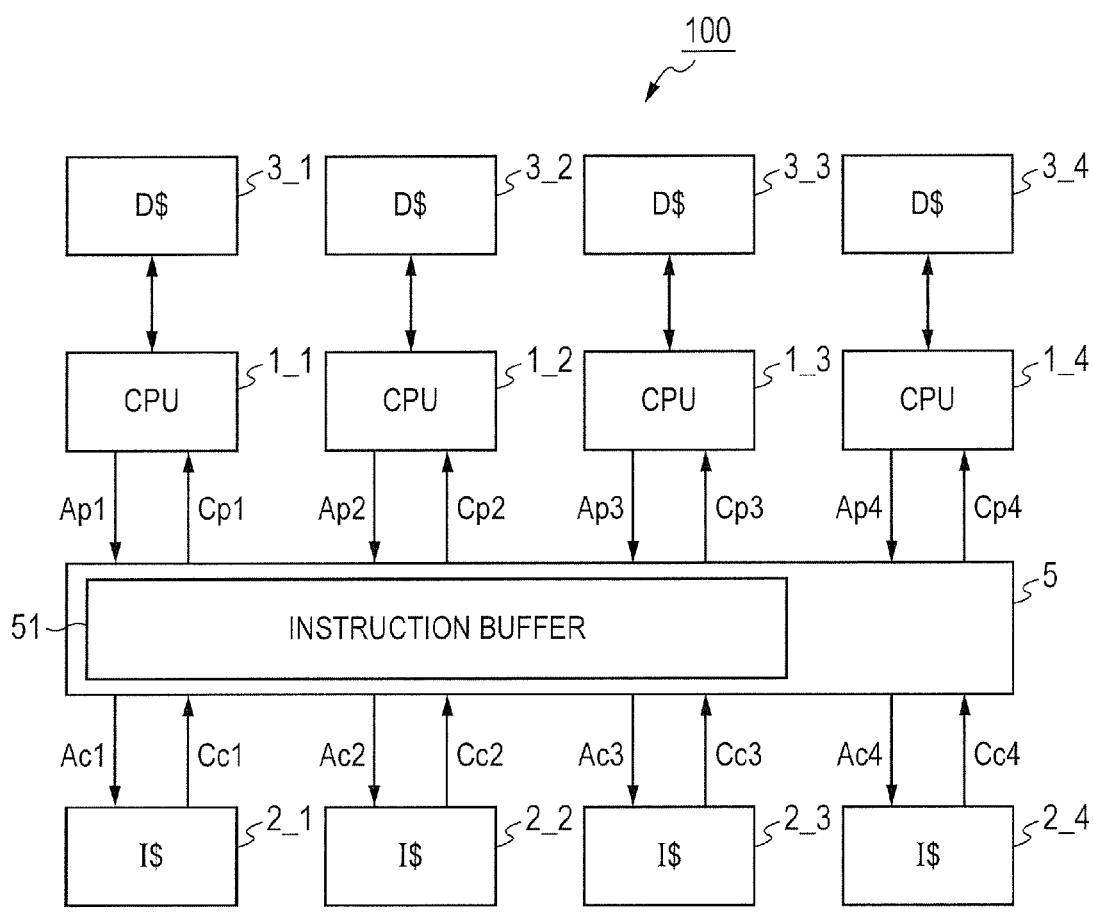
FIG. 12 is a block diagram showing a configuration example of a data processing device according to a fourth embodiment.

FIG. 12 is a block diagram showing a configuration example of a data processing device according to the fourth embodiment.

As in the first embodiment shown in FIG. 1, the data processing device 100 according to the fourth embodiment includes the CPUs 1_1 to 1_4, the instruction cache memories (I$) 2_1 to 2_4 and the data cache memories (D$) 3_1 to 3_4 corresponding to the CPUs 1_1 to 1_4, and includes the instruction cache common bus 5 between the CPUs 1_1 to 1_4 and the instruction cache memories 2_1 to 2_4. Unlike the first embodiment shown in FIG. 1, the instruction cache common bus 5 includes an instruction buffer 51. The instruction buffer 51 has a mechanism for registering an instruction fetched by one of the CPUs 1_1 to 1_4 if the instruction is not registered in the instruction buffer 51. If there is not enough free space to register a new instruction in the instruction buffer 51, the most previously registered instruction is deleted, and the new instruction is registered. Each CPU fetches an instruction from the instruction buffer 51 if the instruction is registered in the instruction buffer 51, or from the corresponding instruction cache memory 2_1 to 2_4 if the instruction is not registered in the instruction buffer 51.

Since the CPUs operating parallelly in the SIMD type fetch the same instruction with a little time difference, there is a high possibility that an instruction registered in the instruction buffer 51 by instruction fetch of one CPU is fetched by the other CPUs. In this case, it is not necessary to operate all instruction cache memories, which enables a reduction in power consumption.

In SIMD-type parallel processing, the same instruction, that is, the same processing is executed on different data, and data-dependent processing is not generally included; accordingly, the same instruction continues to be fetched at the same time. However, in actual SIMD, there are cases where the simultaneity cannot always be maintained. For example, when cache misses occur in data cache memories, cache fill is sequentially performed on the data cache memories; accordingly, after the completion of the cache fill, the same instruction is not necessarily executed at the same time (cycle). On this account, in the data processing device 100 according to the first embodiment, when there occurs a time delay among instruction fetches by the CPUs operating parallelly in the SIMD type, the instruction cache memories are accessed with different timings, so that it might become impossible to reduce power consumption.

The data processing device 100 according to the fourth embodiment includes the instruction buffer 51, thereby solving this problem. That is, when the CPUs operating in the SIMD type issue requests for fetching the instruction code of the same address within a predetermined period, the instruction buffer 51 can supply the instruction code read from one of the corresponding instruction cache memories by one access to the same address, to the CPUs operating in the SIMD type.

Thereby, a time delay among instruction fetches by the CPUs operating in the SIMD type can be absorbed to access only one of the instruction cache memories, thus making it possible to reduce power consumption required for access to the instruction cache memories for instruction fetch. The "predetermined period" is specified by the period (cycle) of a permissible time (cycle) delay among instruction fetches performed originally at the same time. The buffer size of the instruction buffer 51, that is, the number of instruction codes that can be stored therein is properly adjusted in consideration of the predetermined period.

Figure 13:
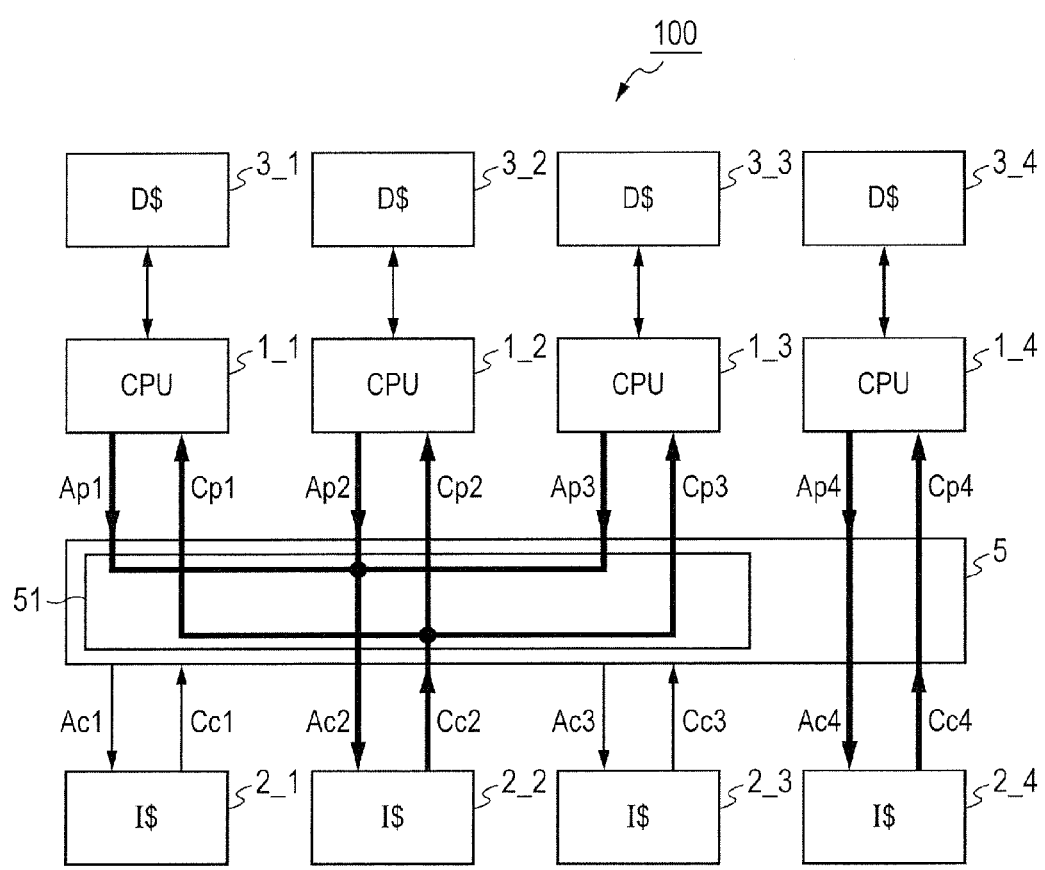
FIG. 13 is an explanation diagram showing an operation example in which some CPUs operate parallelly in the SIMD type in the data processing device according to the fourth embodiment.

FIG. 13 is an explanation diagram showing an operation example in which some CPUs operate parallelly in the SIMD type in the data processing device 100 shown in FIG. 12. Among the CPUs 1_1 to 1_4, the CPUs 1_1 to 1_3 issue requests for fetching the instruction code of the same address, and the other CPU 1_4 issues a request for fetching the instruction code of an address different therefrom. At this time, Ap1=Ap2=Ap3≠Ap4; however, even in the case of the SIMD-type parallel operation, there might be a time delay among the fetch requests of Ap1, Ap2, Ap3, as described above. Assume that the fetch requests are issued in the order of Ap1, Ap2, Ap3. First, when the fetch request of Ap1 is made, the instruction cache common bus 5 supplies, to the CPU 1_1, the instruction code read from the instruction cache memory 2_2 in FIG. 13 as one of the instruction cache memories 2_1 to 2_3 corresponding to the CPUs 1_1 to 1_3, and stores it in the instruction buffer 51. Then, the fetch request of Ap2 is issued. In this case, Ap1 and the corresponding instruction code are stored in the instruction buffer 51, and the fetch-requested Ap2 is compared with the stored Ap1. As a result of this comparison, the fetch-requested address matches the stored address; accordingly, the corresponding instruction code is supplied from the instruction buffer 51 to the CPU 1_2 without accessing the instruction cache memory 2_2. Then, in the case where the fetch request of Ap3 is issued, since Ap1 and the corresponding instruction code are stored in the instruction buffer 51, the fetch-requested Ap3 matches the stored Ap1. Accordingly, the instruction code, corresponding to Ap1, which is identical to the instruction code corresponding to the requested Ap3 is supplied from the instruction buffer 51 to the CPU 1_3 without accessing the instruction cache memory 2_2. Thus, some time delay among the fetch requests from the CPUs 1_1 to 1_3 operating parallelly in the SIMD type can be absorbed by the instruction buffer 51, which enables only one access to the instruction cache memory 2_2. On the other hand, the address Ap4 according to the fetch request from the CPU 1_4 not operating parallelly in the SIMD type does not match the fetch address stored in the instruction buffer 51; accordingly, the instruction cache memory 2_4 is accessed for instruction fetch.

The number of SIMD-operating CPUs and the number of other CPUs are arbitrary, regardless of the above example. When among the CPUs, M CPUs operating in the SIMD type issue requests for fetching the instruction code of the same address within the predetermined period and the other N CPUs issue requests for fetching instruction codes of other addresses within the period (M and N are arbitrary integers), the data processing device 100 operates as follows. The instruction code read from one of M instruction cache memories corresponding to the M CPUs operating in the SIMD type by one access to the same address is supplied to the M CPUs operating in the SIMD type, and the corresponding instruction codes are supplied to the other N CPUs from the corresponding N instruction cache memories. This function can be achieved by including the instruction buffer 51 capable of storing a predetermined number of fetch addresses and the corresponding instruction codes. When a new fetch request is made, the instruction buffer 51 compares a fetch address thereof with fetch addresses stored in the instruction buffer 51. In the case of a match, without accessing the instruction cache memory, the corresponding instruction code stored in the instruction buffer 51 is supplied to the CPU that has made the fetch request. In the case of no match, by accessing the instruction cache memory, the corresponding instruction code is read and supplied to the CPU that has made the fetch request, and is also stored in the instruction buffer.

Thereby, there can coexist the M CPUs operating parallelly in the SIMD type and the N CPUs capable of operating parallelly and independently. Further, a time delay among instruction fetches by the CPUs operating parallelly in the SIMD type can be absorbed to access only one of the instruction cache memories, thus making it possible to reduce power consumption required for access to the instruction cache memories for instruction fetch.

Fifth Embodiment

<Instruction Decode Common Bus>

Figure 14:
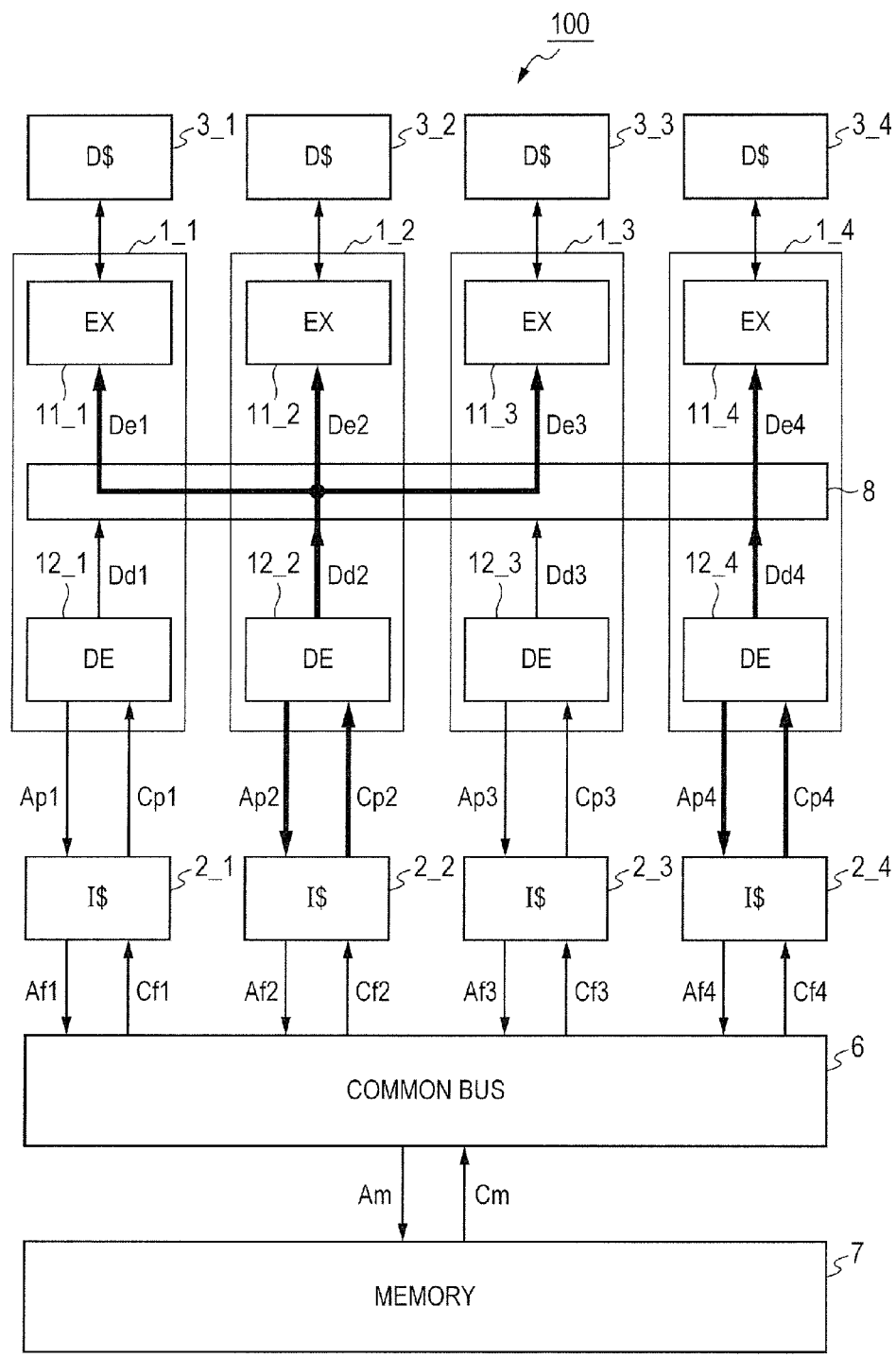
FIG. 14 is a block diagram showing a configuration example of a data processing device according to a fifth embodiment.

FIG. 14 is a block diagram showing a configuration example of a data processing device according to the fifth embodiment.

The data processing device 100 according to the fifth embodiment includes the CPUs 1_1 to 1_4, the instruction cache memories (I$) 2_1 to 2_4 and the data cache memories (D$) 3_1 to 3_4 corresponding to the CPUs 1_1 to 1_4, the common bus 6, and the main memory 7.

The CPUs 1_1 to 1_4 include calculation execution units (EX) 11_1 to 11_4 and instruction decoders (DE) 12_1 to 12_4, respectively. The data processing device 100 further includes an instruction decode common bus 8. The instruction decode common bus 8 couples the calculation execution units (EX) 11_1 to 11_4 to the instruction decoders (DE) 12_1 to 12_4, and enables the output of each instruction decoder 12_1 to 12_4 of the CPU 1_1 to 1_4 to be supplied to the calculation execution unit (EX) 11_1 to 11_4 of an arbitrary CPU. More specifically, this can be achieved by having the same configuration as that of e.g. the instruction cache common bus 5 and the instruction cache selectors (SEL) 4_1 to 4_4 shown in FIG. 5.

When the CPUs 1_1 to 1_4 issue requests for fetching instruction codes of different addresses, the instruction decode common bus 8 supplies the results of decoding the instruction codes corresponding to the addresses from the corresponding instruction decoders 12_1 to 12_4 to the corresponding calculation execution units 11_1 to 11_4. When among the CPUs 1_1 to 1_4, a plurality of CPUs issue requests for fetching the instruction code of the same address, the instruction decode common bus 8 parallelly supplies the result of decoding, by one of the instruction decoders of the CPUs, the instruction code of the same address to all the calculation execution units of the CPUs. The CPUs that issue the requests for fetching the instruction code of the same address are determined to be operating parallelly in the SIMD type. In place of determination by hardware, a mechanism for explicitly specifying CPUs operating in the SIMD type may be provided. The decode result of the instruction decoder of one of the CPUs operating in the SIMD type can be supplied to the calculation execution units of all the CPUs operating in the SIMD type, and the operations of the other instruction decoders can be stopped. Further, instruction fetch units for supplying instruction codes to the instruction decoders whose operations are stopped may also be stopped.

Thereby, without degrading peak performance at the time of operating the CPUs independently, when the CPUs operate in the SIMD type, only one of the instruction decoders of the CPUs is operated, thus making it possible to reduce power consumption required for decoding in addition to instruction fetch.

In the data processing device 100 according to the fifth embodiment, it is preferable that among the instruction decoders 12_1 to 12_4, the instruction decoders not performing instruction decoding and the instruction fetch units coupled thereto can shift to a low power consumption mode. As the low power consumption mode, for example, there can be adopted a method of shutting off power supply, lowering the supplied power supply voltage, shutting off the supply of a clock signal, or lowering the frequency of the supplied clock signal. For example, by performing the DVFS control, the power supply voltage supplied to the instruction decoders and the instruction fetch units not in use is lowered or shut off, and the frequency of the supplied clock is lowered or shut off, thereby further reducing power consumption.

Thereby, it is possible to further reduce power consumption for instruction decoding during the SIMD-type operation.

FIG. 14 shows the example in which the CPUs 1_1 to 1_3 operate parallelly in the SIMD type and simultaneously issue requests for fetching the instruction of the same address, and the other CPU 1_4 executes another program independently thereof, that is, makes a request for fetching the instruction of a different address. In the data processing device 100, the mechanism (not shown) for explicitly specifying CPUs operating in the SIMD type is provided. A decode result Dd2 of the instruction decoder 12_2 is parallelly supplied to the calculation execution units 11_1 to 11_3 of the CPUs 1_1 to 1_3 operating in the SIMD type, and the operations of the other instruction decoders 12_1 and 12_3 and the instruction fetch units (not shown) coupled thereto are stopped. The calculation execution unit 11_4 and the instruction decoder 12_4 of the CPU 1_4 not operating in the SIMD type operate independently of and in parallel with the CPUs 1_1 to 1_3 operating in the SIMD type.

Since the CPUs 1_1 to 1_3 operate parallelly in the SIMD type, the addresses of instructions to be fetched from the corresponding instruction cache memories 2_1 to 2_3 are originally the same address. However, the operations of the instruction decoders 12_1 and 12_3 and the instruction fetch units (not shown) coupled thereto are stopped; accordingly, only the CPU 1_2 requests the instruction fetch based on the address Ac2, and fetches the instruction code Cc2 from the instruction cache memory 2_2. The instruction decoder 12_2 parallelly supplies the result Dd2 of decoding the fetched instruction code Cc2 to the calculation execution units 11_1 to 11_3 of the CPUs 1_1 to 1_3 operating parallelly in the SIMD type. On the other hand, the CPU 1_4 not operating parallelly in the SIMD type reads and fetches the instruction code Cc4 based on the address Ac4 from the instruction cache memory 2_4 independently of and in parallel with the CPUs 1_1 to 1_3, and the instruction decoder 12_4 supplies a result Dd4 of decoding the fetched instruction code Cc4 to the calculation execution unit 11_4.

As described above, by stopping the operations of the instruction decoders 12_1 and 12_3 other than operating one of the instruction decoders of the CPUs 1_1 to 1_3 operating parallelly in the SIMD type, it is possible to reduce power consumption. By causing the instruction decoders 12_1 and 12_3 to shift to the low power consumption mode, the power consumption is further reduced. Further, the operations of the instruction cache memories 2_1 and 2_3 and the instruction fetch units (not shown) coupled to the instruction decoders 12_1 and 12_3 whose operations are stopped are also stopped, which contributes to a reduction in power consumption. By also causing these memories and units to shift to the low power consumption mode, the power consumption is further reduced.

While the invention made above by the present inventors has been described specifically based on the illustrated embodiments, the present invention is not limited thereto. It is needless to say that various changes and modifications can be made thereto without departing from the spirit and scope of the invention.

For example, the CPU may be a processor of any type of architecture including the von Neumann type and Harvard architecture.

What is claimed is:

1. A data processing device comprising:
a plurality of CPUs; and
a plurality of memories corresponding to the CPUs,
wherein when the CPUs issue requests for fetching instruction codes of different addresses from the corresponding memories, the instruction codes are supplied from the corresponding memories to the corresponding CPUs,
wherein when the CPUs issue requests for fetching an instruction code of a same address from the corresponding memories, the instruction code read from one of the memories by one access to the same address is supplied, in parallel, to the CPUs, and
wherein when among the CPUs, M CPUs issue requests for fetching an instruction code of a same address and the other N CPUs issue requests for fetching instruction codes of addresses different from the address (M and N are positive integers), the instruction code read from one of M memories corresponding to the M CPUs by one access to the same address is supplied, in parallel, to the M CPUs, and from N memories corresponding to the N CPUs, the corresponding instruction codes are supplied to the corresponding CPUs.

2. The data processing device according to claim 1,
wherein the memories are instruction cache memories, an instruction cache common bus is further provided, and the instruction cache common bus is coupled to the CPUs and the instruction cache memories,
wherein when the CPUs issue requests for fetching instruction codes of different addresses, the instruction codes are supplied from the corresponding instruction cache memories to the corresponding CPUs, and
wherein when the CPUs issue requests for fetching an instruction code of a same address, the instruction code read from one of the instruction cache memories by one access to the address is supplied, in parallel, to the CPUs.

3. The data processing device according to claim 1, further comprising a mode setting mechanism capable of specifying which CPUs among the CPUs function as the M CPUs.

4. The data processing device according to claim 1, wherein the data processing device monitors addresses issued when the CPUs request instruction fetch, and specifies CPUs that request fetch of an instruction code of a same address, as the M CPUs.

5. The data processing device according to claim 1, wherein among the memories, an unaccessed memory shifts to a low power consumption mode.

6. A data processing device comprising:
a plurality of CPUs;
a plurality of memories corresponding to the CPUs; and
an instruction buffer,
wherein the memories are instruction cache memories, and the instruction buffer is coupled to the CPUs and the instruction cache memories,
wherein when the CPUs issue requests for fetching an instruction code of a same address within a predetermined period, the instruction buffer supplies to the CPUs the instruction code read from one of the instruction cache memories by one access to the address, and
wherein when the CPUs issue requests for fetching instruction codes of different addresses within the predetermined period, the instruction buffer supplies the instruction codes from the corresponding instruction cache memories to the corresponding CPUs, and
wherein when among the CPUs, M CPUs issue requests for fetching an instruction code of a same address within the predetermined period and the other N CPUs issue requests for fetching instruction codes of addresses different from the same address within the predetermined period (M and N are positive integers), the instruction code read from one of M instruction cache memories corresponding to the M CPUs by one access to the same address is supplied to the M CPUs, and from N instruction cache memories corresponding to the N CPUs, the corresponding instruction codes are supplied to the corresponding CPUs.

7. A data processing device comprising:
a plurality of CPUs;
a plurality of memories corresponding to the CPUs; and
an instruction decode common bus,
wherein the CPUs comprise calculation execution units and instruction decode units respectively,
wherein the instruction decode common bus is coupled to the calculation execution units of the CPUs and the instruction decode units of the CPUs,
wherein when the CPUs issue requests for fetching instruction codes of different addresses, the instruction decode common bus supplies results of decoding the instruction codes from the corresponding instruction decode units to the corresponding calculation execution units,
wherein when the CPUs issue requests for fetching an instruction code of a same address, the instruction decode common bus supplies, in parallel, a result of decoding, by one of the instruction decode units of the CPUs, the instruction code to the corresponding calculation execution units, and
wherein when among the CPUs, M CPUs issue requests for fetching an instruction code of a same address and the other N CPUs issue requests for fetching instruction codes of addresses different from the address (M and N are positive integers), the instruction decode common bus supplies, in parallel, a result of decoding the instruction code by one of M instruction decode units corresponding to the M CPUs, in parallel, to the M CPUs, and from N instruction decode units corresponding to the N CPUs, the corresponding results of decoding the instruction codes are supplied to the corresponding CPUs.

8. The data processing device according to claim 7, wherein among the instruction decode units, an instruction decode unit not performing instruction decoding shifts to a low power consumption mode.

9. A data processing device comprising:
a plurality of CPUs;
a memory; and
a common bus for coupling the CPUs to the memory,
wherein when the CPUs issue requests for fetching instruction codes of different addresses from the memory, the instruction codes from the corresponding addresses of the memory are sequentially supplied to the corresponding CPUs,
wherein when the CPUs issue requests for fetching an instruction code of a same address from the memory, the instruction code read from the memory by one access to the same address is supplied, in parallel, to the CPUs, and
wherein when among the CPUs, M CPUs issue requests for fetching an instruction code of a same address and the other N CPUs issue requests for fetching instruction codes of addresses different from the address (M and N are positive integers), the instruction code for fetch requested by the M CPUs is read from the memory by one access to the same address and supplied, in parallel, to the M CPUs, and the instruction codes for fetch requested by the N CPUs are sequentially read from the memory and sequentially supplied to the corresponding CPUs.

10. The data processing device according to claim 9, further comprising a mode setting mechanism capable of specifying which CPUs among the CPUs function as the M CPUs.

11. The data processing device according to claim 9, wherein the data processing device monitors addresses issued when the CPUs request instruction fetch, and specifies CPUs that request fetch of an instruction code of a same address, as the M CPUs.

12. A data processing device comprising:
a plurality of CPUs;
a plurality of instruction cache memories respectively coupled to the CPUs;
a main memory; and
a common bus for coupling the instruction cache memories to the main memory,
wherein when the instruction cache memories issue requests for reading instruction codes of different addresses from the main memory, the instruction codes from the corresponding addresses of the main memory are sequentially supplied to the corresponding instruction cache memories,
wherein when the instruction cache memories issue requests for reading an instruction code of a same address from the main memory, the instruction code read from the main memory by one access to the same address is supplied, in parallel, to the instruction cache memories, and
wherein when M instruction cache memories respectively coupled to M CPUs among the CPUs issue requests for reading a set of instruction codes of a same address from the main memory for cache fill and the other N CPUs issue requests for reading sets of instruction codes, of different addresses, different from the set of instruction codes of the same address, for cache fill (M and N are positive integers):
the set of instruction codes for cache fill requested by the M CPUs is read from the main memory by a set of access and supplied, in parallel, to the instruction cache memories corresponding to the M CPUs, and
the sets of instruction codes for cache fill requested by the N CPUs are sequentially read from the main memory and sequentially supplied to the corresponding instruction cache memories.

13. The data processing device according to claim 12, further comprising a mode setting mechanism capable of specifying which CPUs among the CPUs function as the M CPUs.

14. The data processing device according to claim 12, wherein the data processing device monitors addresses issued when the instruction cache memories request cache fill, and specifies CPUs corresponding to instruction cache memories that request cache fill of an instruction code of a same address, as the M CPUs.

* * * * *